United States Patent
Tebar

(10) Patent No.: US 12,476,454 B2
(45) Date of Patent: Nov. 18, 2025

(54) COMMON MODE VOLTAGE CLAMP FOR MULTIDROP NETWORKS

(71) Applicant: Analog Devices International Unlimited Company, Limerick (IE)

(72) Inventor: Juan Carlos Garcia Tebar, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 146 days.

(21) Appl. No.: 18/052,458

(22) Filed: Nov. 3, 2022

(65) Prior Publication Data
US 2024/0154407 A1 May 9, 2024

(51) Int. Cl.
*H02H 9/00* (2006.01)
*H02H 9/04* (2006.01)

(52) U.S. Cl.
CPC .................................. *H02H 9/046* (2013.01)

(58) Field of Classification Search
CPC ...................................................... H02H 9/046
USPC ........................................... 361/56, 111, 93.1
See application file for complete search history.

(56) References Cited

U.S. PATENT DOCUMENTS

| | | | |
|---|---|---|---|
| 5,151,840 A * | 9/1992 | Siefken | H01H 9/547 361/13 |
| 6,801,080 B1 | 10/2004 | Arcus | |
| 7,009,541 B1 * | 3/2006 | Nguyen | H03M 3/356 341/120 |
| 2004/0080352 A1 * | 4/2004 | Noda | G05F 3/242 327/321 |
| 2012/0250199 A1 | 10/2012 | Woo | |
| 2017/0126002 A1 * | 5/2017 | Gittemeier | H02H 9/046 |
| 2022/0158448 A1 * | 5/2022 | Uemura | H02H 9/046 |

FOREIGN PATENT DOCUMENTS

JP 2015019219 A 1/2015

OTHER PUBLICATIONS

Pan et al., *An Analog Front-End for 100BASE-T1 Automotive Ethernet in 28nm CMOS*, ISSCC 2016, Session 10, Advanced Wireline Transceivers and PLLs, 10.3, 3 pages.
International Search Report and Written Opinion in PCT/EP2023/080526, mailed Feb. 8, 2024, 15 pages.

* cited by examiner

*Primary Examiner* — Sean Kayes
*Assistant Examiner* — Lucy M Thomas
(74) *Attorney, Agent, or Firm* — ArentFox Schiff LLP

(57) ABSTRACT

An example common mode (CM) voltage clamp for a node of a multidrop network includes a first and second CM voltage dividers coupled to first and second lines of a differential link; a first N-type transistor coupled to the first line via a first diode, and further coupled to the first CM voltage divider; a second N-type transistor coupled to the second line via a second diode, and further coupled to the first CM voltage divider; a first P-type transistor coupled to a ground signal of the node via a third diode, and further coupled to the second CM voltage divider; and a second P-type transistor coupled to the ground signal of the node via a fourth diode and further coupled to the second CM voltage divider, where the second CM voltage divider is further be coupled to the ground signal via a fifth diode.

19 Claims, 15 Drawing Sheets

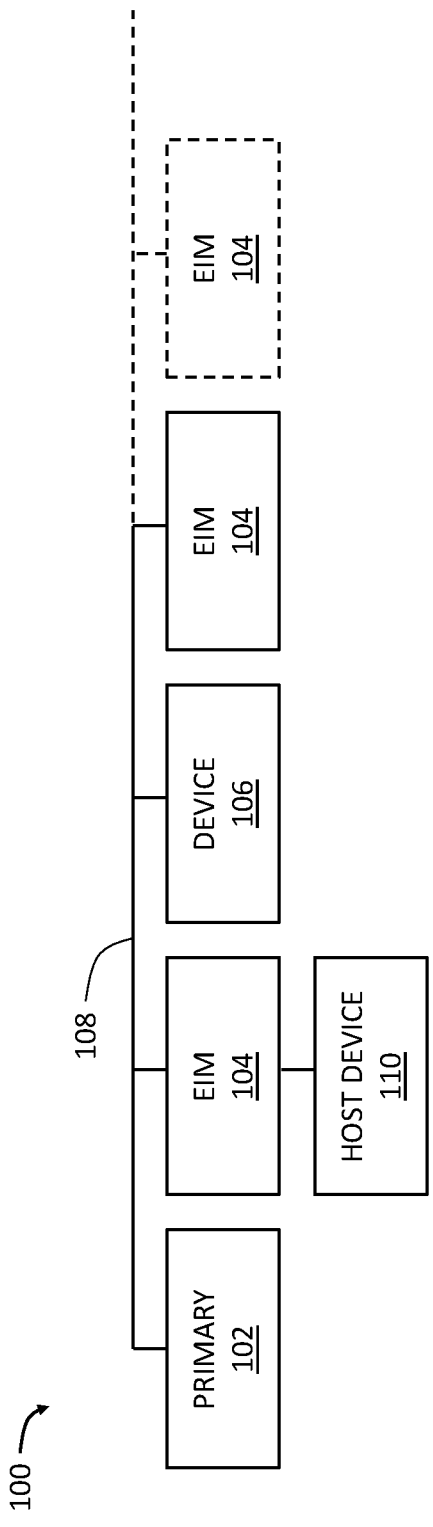
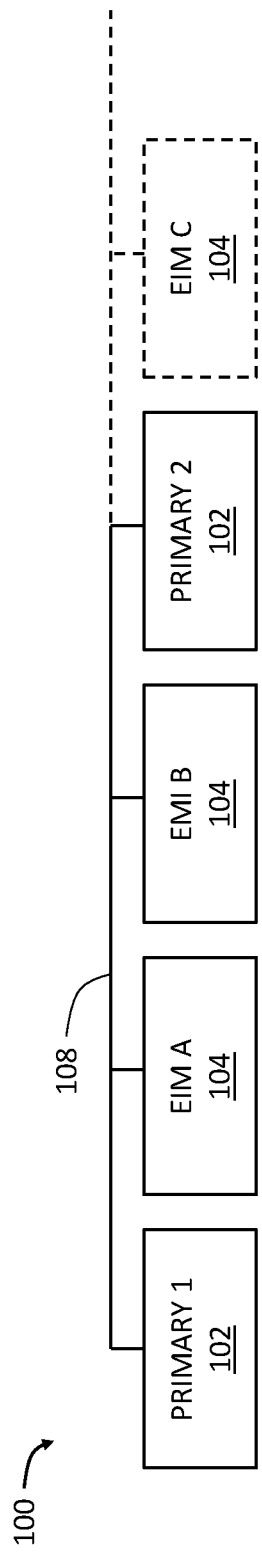
FIG. 1A
FIG. 1B

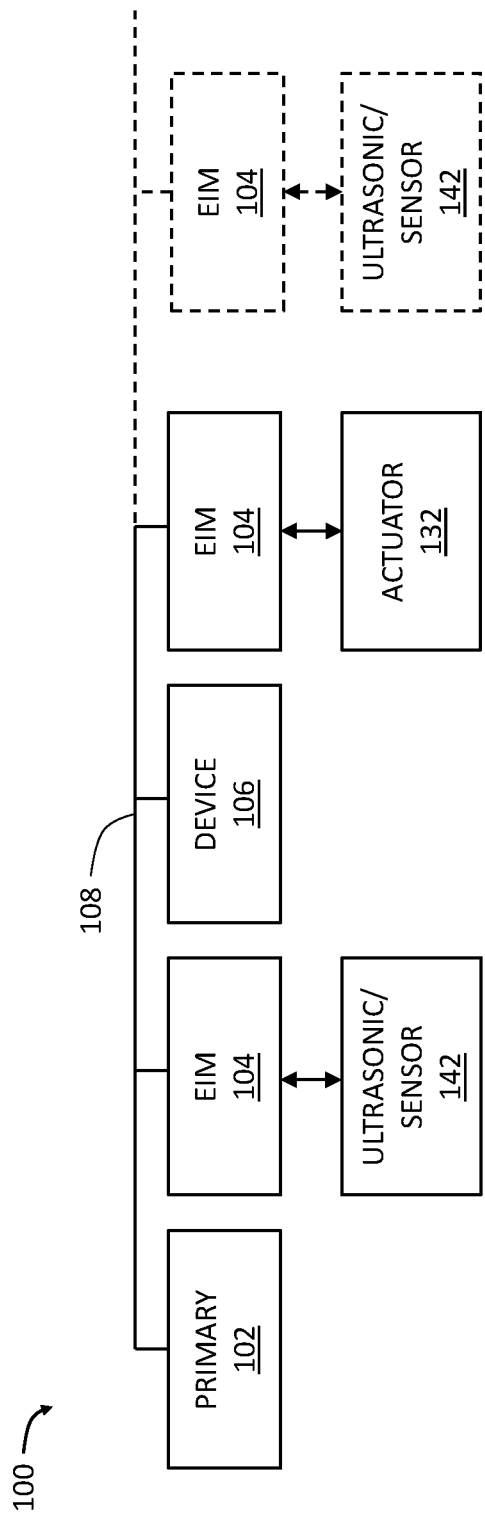
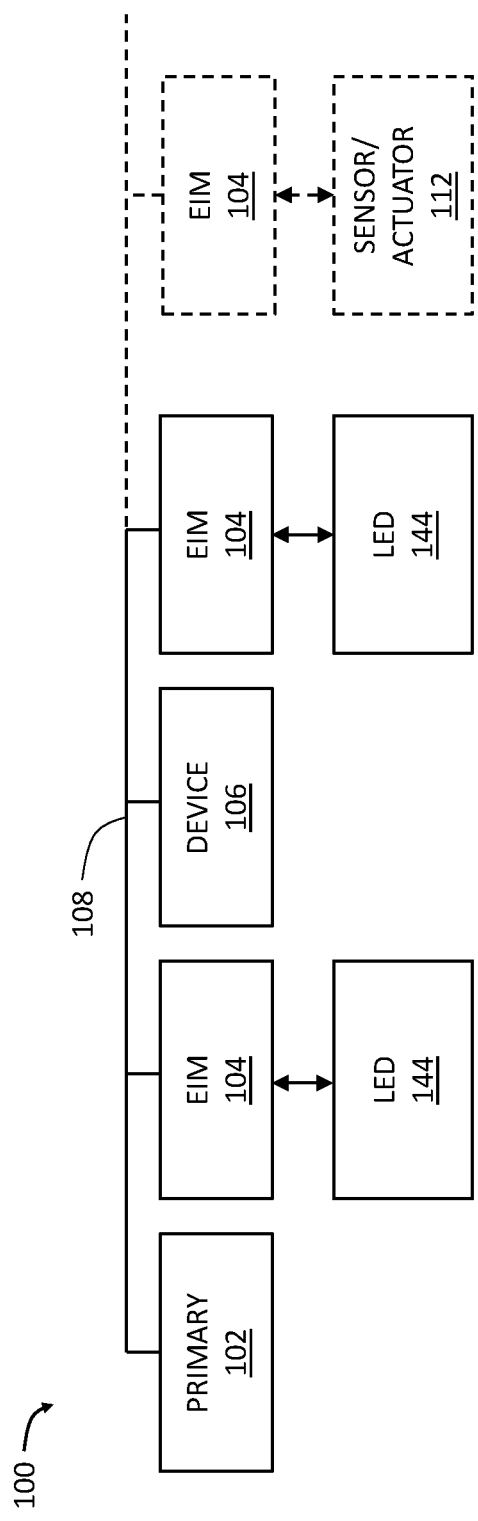

COMMON MODE VOLTAGE CLAMP FOR MULTIDROP NETWORKS

TECHNICAL FIELD OF THE DISCLOSURE

The present disclosure relates to wired communications between multiple nodes, and in particular, to common-mode clamping circuits for multidrop networks.

BACKGROUND

Multidrop networks may be used in various applications to enable multiple nodes to communicate information over a cable. Information communication over a cable is sometimes referred to as "wired communication" to differentiate it from wireless communication. Information can be communicated among the nodes of a multidrop network by sending packets of data according to a protocol, e.g., an Ethernet protocol. For example, IEEE 802.3 is a working group and a collection of Institute of Electrical and Electronics Engineers (IEEE) standards produced by the working group defining the physical layer and data link layer's media access control (MAC) of wired Ethernet that may be used to realize multidrop networks.

As an example of using multidrop networks in automotive applications, a multidrop network may enable multiples nodes of a vehicle, such as sensors, actuators, electronic control unit (EUC), etc., to communicate information over a single cable. To that end, Ethernet communication according to 10BASE-T1S, described in IEEE 802.3, may be used, since it is suitable for Ethernet communications with cables lengths in the range of up to about 25 meters.

Individual nodes of a multidrop network include transceivers configured to transmit and receive packets of information, e.g., in a half-duplex configuration. In multidrop networks such as e.g., 10BASE-T1S, CAN and Flexray used in automotive applications, at any given time typically only one of the transceivers connected to a given cable may transmit information over the cable, with the other transceivers connected to that cable not transmitting at that time. In such networks, each transceiver connected to a cable needs to present a high differential impedance to the line when not transmitting, to allow other transmitters to transmit information correctly. In order to support partial networking and for fault tolerance, a transceiver must also maintain this high differential impedance when its power supply is not present (i.e., when power supply is either at 0V or not connected). Realizing this is not trivial and a variety of factors can affect the cost, quality and robustness of a multidrop communications link. Physical constraints such as space/surface area and also regulations can pose further constraints to the multidrop communication link requirements or specifications, and thus trade-off and ingenuity has to be exercised.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 1A-1L are block diagrams of examples of multidrop networks in accordance with some embodiments of the present disclosure;

DESCRIPTION OF EXAMPLE EMBODIMENTS OF THE DISCLOSURE

Overview

Figure 1C:
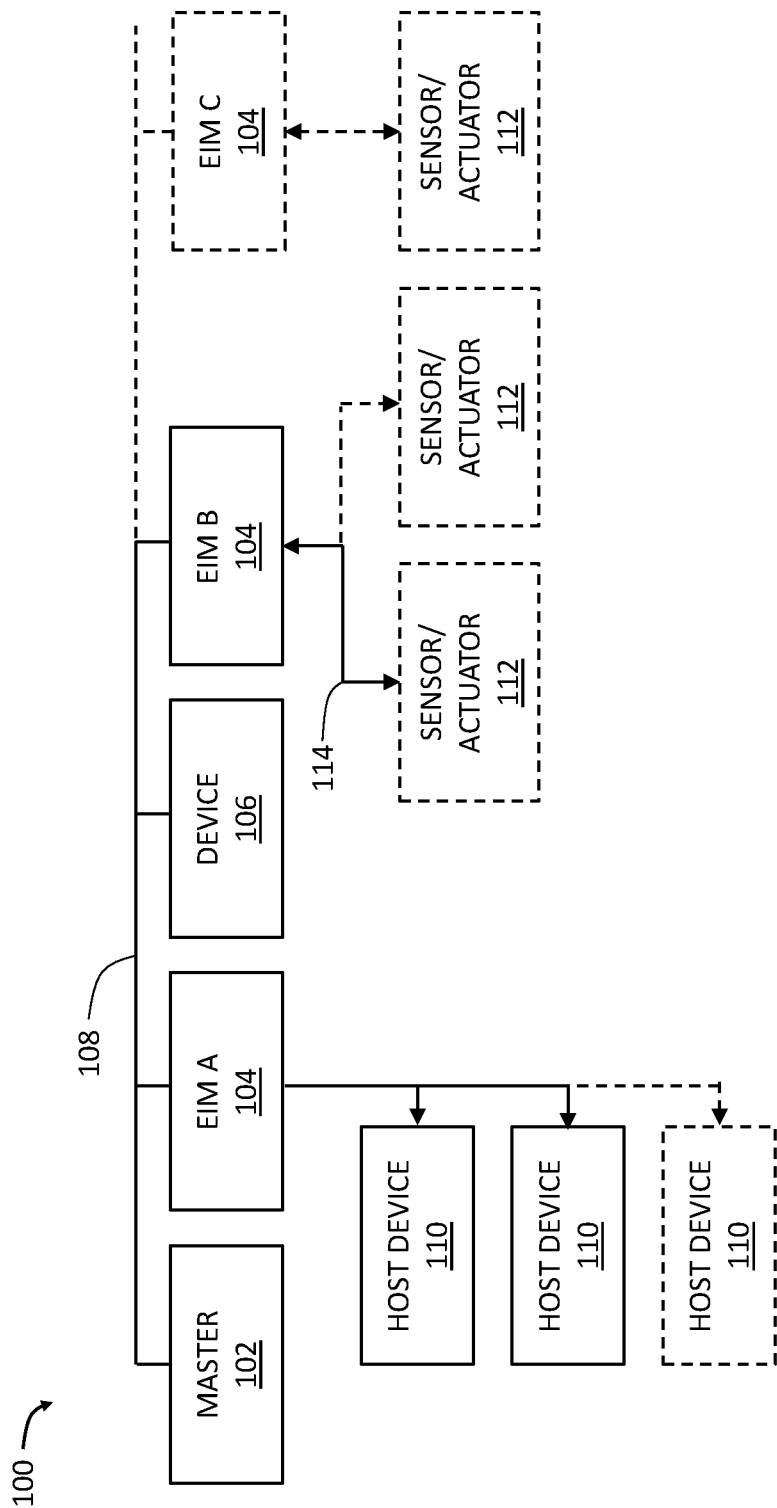

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

As briefly described above, in some applications, each transceiver connected to a cable of a multidrop network needs to present a high differential impedance to the line when not transmitting, also if its power supply is not present. The challenge of accomplishing this is complicated greatly by the automotive electromagnetic compatibility (EMC) environment, where peak-to-peak voltages of up to 100 Volts (V) can develop on the line, e.g., during Bulk Current Injection (BCI) testing. CM chokes may be used to help attenuate the common mode disturbances seen by the transceiver, but the CM choke by itself merely provides a high impedance series impedance to the line, and as a high differential impedance needs to be presented by the transceiver, it is difficult to present a low CM impedance within the constraints already noted. The net outcome of the above, is that the transmitter circuits need to use high-voltage devices that can stand off the large CM voltages without turning on when tri-stated (otherwise the differential signal is destroyed), the same for the electrostatic discharge (ESD) protection, and the receiver circuits additionally need to function and correctly extract the differential signal in the presence of large CM voltage excursions. These problems can be and have been solved, but the net impact is an increase in die area and power consumption, as well as capacitance at the pins of a physical (PHY) layer of the network.

Disclosed herein are active clamp circuits that may provide improvements on one or more challenges described above. As known in the art, the term "clamp circuit" or, simply, a "clamp" refers to a circuit configured to control the highest and/or the lowest levels of an input signal. This is referred to, respectively, as "high-side clamping" and "low-side clamping." High-side clamping may be used to limit the input signal to a device to avoid damage. Low-side clamping may be used to set a minimum voltage into a device to ensure proper operation of the device. Some electronic components operate better when signals provided to them are differential signals. A differential signal is provided via two lines: a positive line (denoted in some of the present drawings as "vp") and a negative line (denoted in some of the present drawings as "vn").

In one aspect of the present disclosure, a CM voltage clamp configured to provide a low CM impedance for CM disturbances above a certain magnitude, while at the same time maintaining a high differential-mode impedance across all conditions, is disclosed. By presenting a low CM impedance, a voltage divider effect may be established between the choke impedance and the impedance of the CM voltage clamp. This may be achieved by sensing/detecting the CM voltage relative to the ground of a transceiver via two separate voltage divider circuits (which may be high-value resistive attenuator circuits) and applying the two voltages sensed by these two voltage divider circuits to, respectively, two N-type transistors and two P-type transistors. For the example where the transistors are field-effect transistors (FETs), each of the two N-type transistors may have its source terminal coupled (e.g., directly connected) to the transceiver ground, while the drain terminals of these transistors may be coupled to, respectively, the positive line and the negative line of a differential link via respective diodes. The function of these diodes may be to prevent a body diode of each N-type transistor conducting during CM voltage events which drop below the transceiver ground. The connection to the P-type transistors may be more complex, to float the gate voltage, back gate voltage, source and drain voltage of the P-type transistors up for positive CM voltage excursions to prevent diodes turning on which would disturb the differential signal. For this reason, for the example where the transistors are FETs, each of the two P-type transistors may have its source terminal and its back-gate terminal connect to the transceiver ground via diodes and a PMOS gate voltage resistive divider may also have a diode with anode connected to ground in its connection to the transceiver ground. The drain terminals of the two P-type transistors may be coupled (e.g., directly connected) to, respectively, the positive line and the negative line of the differential link. Because the two N-type transistors and two P-type transistors have an attenuated version of the drain to source voltage connected to their gates, whenever these transistors are conducting, the device is biased in saturation, and, as a result, the differential impedance looking into the circuit is determined by a multiple of drain-source resistance (RDS), e.g., 2*RDS, of the devices in saturation, which is a high value (of the order of 100 kOhms), and thus does not affect the differential signal.

An example CM voltage clamp for a node of a multidrop network may include a first and second CM voltage dividers coupled to first and second lines of a differential link; a first N-type transistor coupled to the first line via a first diode, and further coupled to the first CM voltage divider; a second N-type transistor coupled to the second line via a second diode, and further coupled to the first CM voltage divider; a first P-type transistor coupled to a ground signal of the node via a third diode, and further coupled to the second CM voltage divider; and a second P-type transistor coupled to the ground signal of the node via a fourth diode and further coupled to the second CM voltage divider. In such a CM voltage clamp, the second CM voltage divider may further be coupled to the ground signal via a fifth diode.

CM voltage clamps described herein may be particularly suitable for, but are not limited to, being used in a vehicle (where the term "vehicle" includes not only wheeled vehicle such as a car, a truck, or a bus, but also includes an airplane, an aircraft, or a spacecraft, for example), in a surveillance system, or in any other environment where a first transceiver, placed at one location within such an environment (e.g., within a vehicle), and a second transceiver, placed at another location within such an environment, may need to communicate information/signals with one another over a wired link by means of a multidrop network. The wired link may be a differential, AC-coupled analog transmission link.

The exact design of CM voltage clamps described herein may be realized in many different ways, all of which being within the scope of the present disclosure. In one example of design variations according to various embodiments of the present disclosure, a choice can be made, individually for each of the transistors of a CM voltage clamp described herein, to employ bipolar transistors (e.g., where various transistors may be NPN or PNP transistors), FETs, e.g., metal-oxide-semiconductor (MOS) technology transistors (e.g., where various transistors may be N-type MOS (NMOS) or P-type MOS (PMOS) transistors), or a combination of one or more FETs and one or more bipolar transistors. In view of that, even though the following descriptions refer to FETs and their respective terminals, the descriptions are equally applicable to bipolar transistors. In general, transistors described herein may be seen in a general form as transistors having first, second, and third terminals. The term "first terminal" of a transistor may be used to refer to a gate terminal if the transistor is a FET or to a base terminal if the transistor is a bipolar transistor, the term "second terminal" of a transistor may be used to refer to a drain terminal if the transistor is a FET or to a collector terminal if the transistor is a bipolar transistor, and the term "third terminal" of a transistor may be used to refer to a source terminal if the transistor is a FET or to an emitter terminal if the transistor is a bipolar transistor. These terms remain the same irrespective of whether a transistor of a given technology is an N-type transistor (e.g., an NPN transistor if the transistor is a bipolar transistor or an NMOS transistor if the transistor is a FET) or a P-type transistor (e.g., a PNP transistor if the transistor is a bipolar transistor or a PMOS transistor if the transistor is a FET).

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Furthermore, for the purposes of the present disclosure, the phrase "A and/or B" or notation "A/B" means (A), (B), or (A and B), while the phrase "A, B, and/or C" means (A), (B), (C), (A and B), (A and C), (B and C), or (A, B, and C). As used herein, the notation "A/B/C" means (A, B, and/or C). The term "between," when used with reference to measurement ranges, is inclusive of the ends of the measurement ranges.

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Sometimes, in the present descriptions, the term "circuit" may be omitted (e.g., a clamp circuit may be referred to simply as a "clamp," etc.). In yet another example, some terms may be used interchangeably, as known in the art. For example, the terms "link," "wire," and "cable" may be used interchangeably, the terms "node," "transceiver," and "network interface module" may be used interchangeably, etc. If used, the terms "substantially," "approximately," "about," etc., may be used to generally refer to being within +/−10% of a target value, e.g., within +/−5% of a target value or within +/−2% of a target value, based on the context of a particular value as described herein or as known in the art.

Other features and advantages of the disclosure will be apparent from the following description and the claims.

FIGS. 1A-1L are block diagrams of examples of multi-drop networks 100 in accordance with some embodiments of the present disclosure. For example, in some implementations, to reduce the cost of implementing a switched network such as an Ethernet network, a low complexity multidrop network can be implemented using half-duplex devices.

FIG. 1A is a block diagram of an example of a low complexity multidrop network 100. As shown in FIG. 1A, the network 100 may include a primary device 102, or primary node, and multiple network interface modules connected as network nodes on a shared network link 108 (e.g., a shared bus). In this example, the multidrop network is an Ethernet network and the network interface modules are Ethernet network Interface modules (EIMs) 104. The primary device 102 may be any Ethernet aware device with sufficient processing capability to perform the functions described. Examples include a personal computer (PC), cloud-based server, a programmable logic controller (PLC), electronic control unit (ECU), central/zonal processing unit, or a dedicated controller. The primary device 102 may initiate actions taken by the EIMs 104 which are secondary nodes, and may transmits read frames, write frames, discovery frames and status frames to the EIMs 104.

An EIM 104 may be used to connect a device (e.g., a host device 110) to the network 100. To keep the EIM 104 simple and low cost, an EIM 104 may be comprised of only hardware circuits and may include no processors or controllers performing instructions included in software. An EIM 104 may include a hardware state machine and other logic circuitry to perform the functions described. The network may include other Ethernet devices 106 besides primary devices and EIMs. These other devices 106 may include a physical (PHY) layer, a medium access control (MAC) layer, and may include a microprocessor or microcontroller to perform functions related to transferring data using the network 100.

The network 100 is a multidrop network in which all network nodes see all the data that is transmitted on the shared link 108 (e.g., a shared bus). Due to the broadcast nature of multidrop networks, there is a single transmitter on the network and multiple receivers at any one time. The network nodes have only a single half-duplex port to the shared network link 108. Because access to the link 108 is shared between all network nodes of the network 100, each node can only transmit when no other nodes are currently transmitting. This means the network nodes may be configured to store all relevant information to be transmitted until the shared link becomes available, at which time they can transmit their data on the shared link and all other nodes on the shared link can receive the data. The half-duplex nature of the multidrop network also means a network node should be able to handle collisions on the shared link appropriately.

FIG. 1B is a block diagram of another example of a low complexity Ethernet multidrop network in which the network 100 includes multiple primary devices 102 (Primary 1, Primary 2) and multiple EIMs 104 (EIM A, EIM B, EIM C). The network 100 shown in FIG. 1B can be used to transmit unicast frames and multicast frames.

FIG. 1C is a block diagram of another example of a low complexity Ethernet multidrop network in which the network 100 includes a primary device 102 and multiple EIMs 104 (EIM A, EIM B, EIM C) connected to the shared network link 108. EIM B may be connects multiple sensors/actuators 112 to the shared network link 108. For example, the multiple sensors/actuators 112 may be added to a shared bus 114 that may be connected to the external interface of EIM B. In certain examples, multiple sensors/actuators 112 may be connected in parallel using for example an SPI, GPIO interface, or UART interface. In certain examples, the multiple sensors/actuators 112 may be connected to the EIM through analog signal inputs and outputs.

Figure 1D:
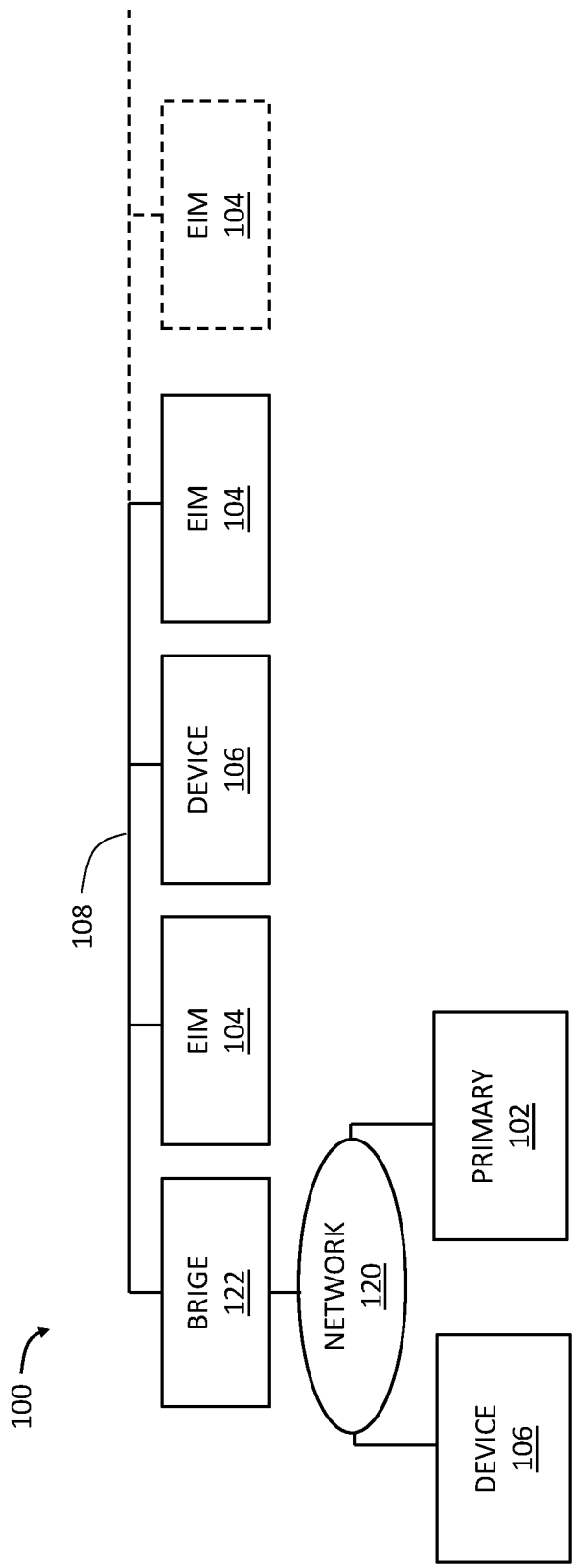

FIG. 1D is a block diagram of another example of a low complexity Ethernet multidrop network 100. The primary device 102 is connected through an intermediate network connection (e.g., a network 120 and a network bridge device 122) and does not need to be connected to the secondary node by the network link 108.

Figure 1E:
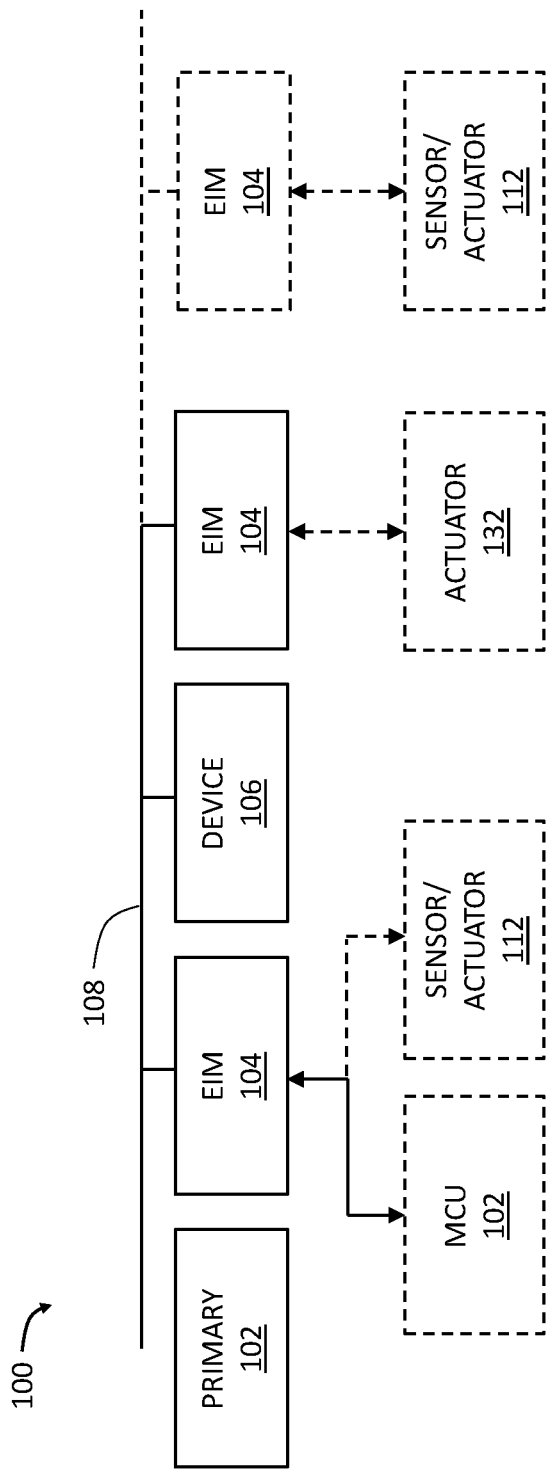

FIG. 1E is a block diagram of still another low complexity Ethernet multidrop network 100. The network 100 may include multiple primary devices 102, but one of the primary devices (e.g., a microcontroller unit, or MCU) is connected to the shared network link 108 through an EIM 104. The primary device 102 connected to the shared network link 108 through the EIM 104 may include a PHY layer and MAC layer connected to a micro controller. This allows that EIM 104 to function as both a primary device and a secondary device. FIG. 1E also illustrates an actuator 132 that may be connected to the shared network link 108 through another EIM 104.

Figure 1F:
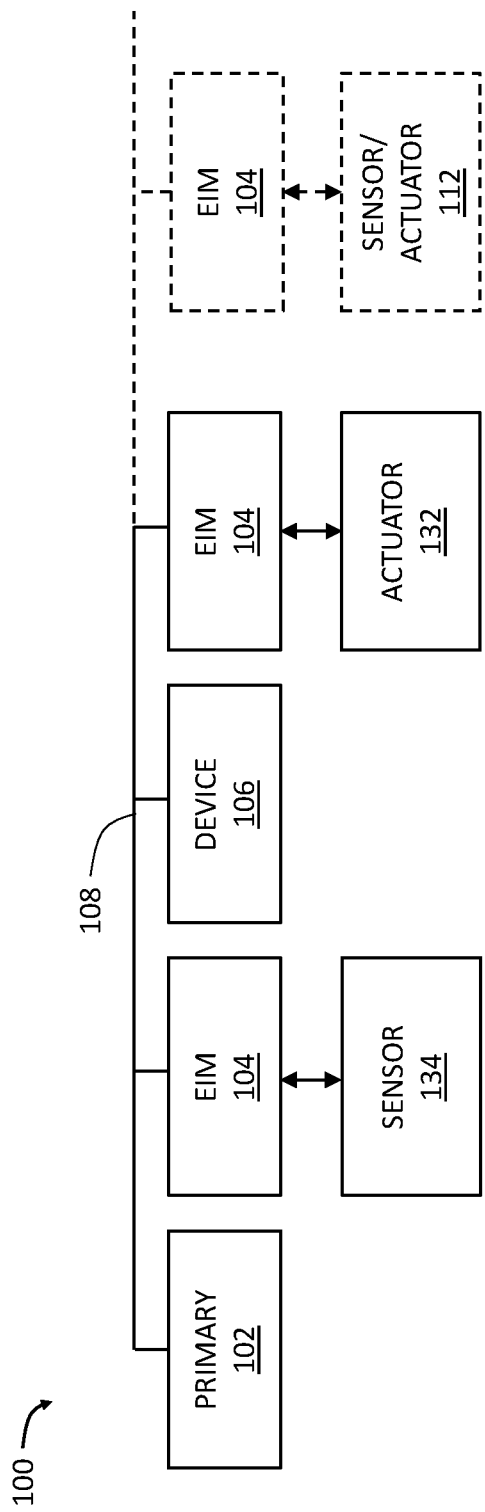

FIG. 1F is a block diagram of another example of a low complexity multidrop network 100. The network 100 of FIG. 1F includes one or more primary devices 102 and multiple EIMs 104 connected as network nodes on a single Ethernet link 108 that connects multiple sensors/actuators 112, actuators 132, or sensors 134 in a multidrop fashion. The single low complexity multidrop network 100 can support replacement of multiple legacy networks. No processing is required at the sensor 134 or the actuator 132 enabling all processing to be performed at the primary device 102. The primary device 102 may be incorporated in a central or zonal processing unit or other electronic control unit (ECU). The network 100 can be used to provide connectivity of sensors and actuators for car doors and car seats.

Figure 1G:
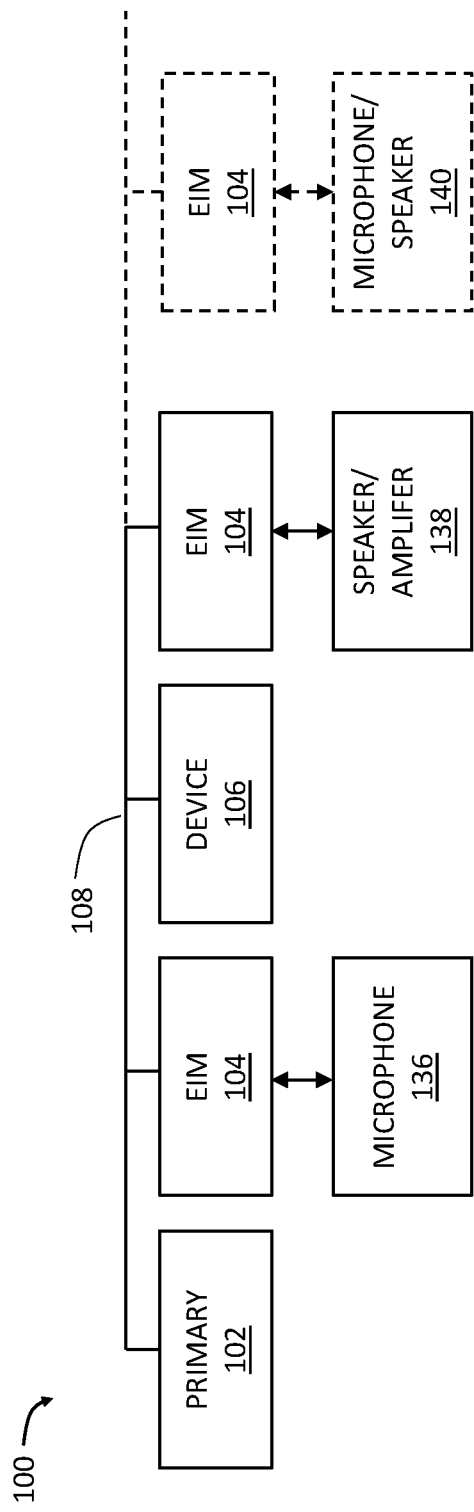

FIG. 1G is a block diagram of another example of a low complexity multidrop network 100. The network 100 of FIG. 1G includes one or more primary devices 1202 and EIMs 1204 connected as network nodes on a single shared network link 108 that connects multiple audio devices such as one or more microphones 136, one or more speakers/amplifiers 138, and/or one or more microphones/speakers 140 to the network. The network 100 may support Ethernet connectivity to the multiple audio devices without the need for processing at the audio device nodes. This provides a low latency deterministic connection for automotive applications.

FIG. 1H is a block diagram of another example of a low complexity multidrop network 100. The network 100 of FIG. 1H includes one or more primary devices 102 and EIMs 104 connected as network nodes on a single shared network link 108 that connects multiple ultrasonic sensors or other ultrasonic (ultrasonic/sensor) devices 142 to the network. The multidrop approach enables the processing to be removed from each ultrasonic/sensor device 142 and consolidates the processing in one or more of the primary nodes 102.

FIG. 1I is a block diagram of another example of a low complexity multidrop network 100. The network 100 of FIG. 1I includes one or more primary devices 102 and EIMs 104 connected as network nodes on a single shared network link 108 that connects multiple arrays of light emitting diodes (LEDs) 144 to the network. The LEDs 144 could be used for interior lighting in vehicles or external headlights in vehicles. Traditional Ethernet devices 106 not using low complexity technology can also be connected to the network 100.

Figure 1J:
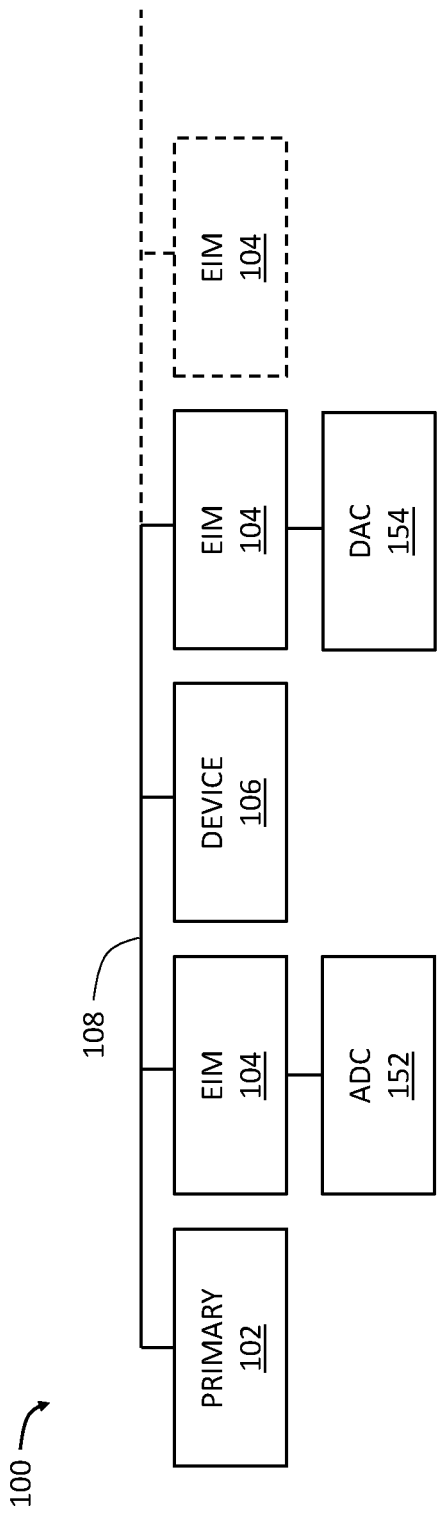

FIG. 1J is a block diagram of another example of a low complexity multidrop network 100. The network 100 of FIG. 1J includes one or more primary devices 102 and EIMs 104 connected as network nodes on a single shared network link 108 that connects one or more analog-to-digital converters (ADCs) 152 and one or more digital-to-analog converters (DACs) 154.

Figure 1K:
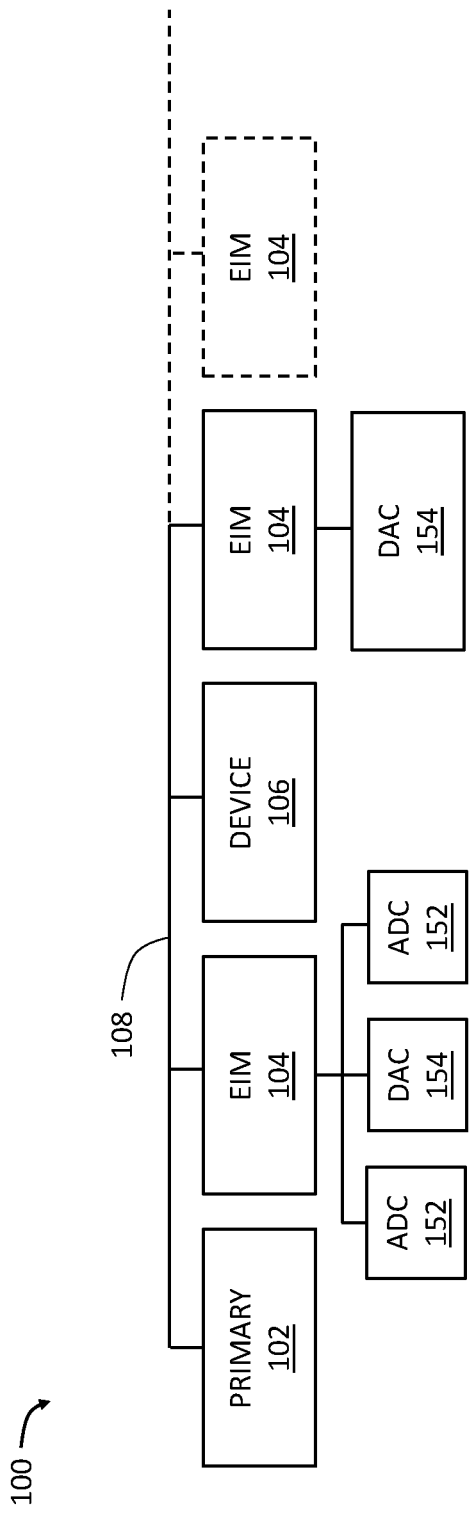

FIG. 1K is a block diagram of another example of a low complexity multidrop network. 100. The network 100 of FIG. 1K includes one or more primary devices 102 and EIMs 104 connected as network nodes on a single shared network link 108. Like the network in FIG. 1J, the network 100 of FIG. 1K connects ADCs 152 and DACs 154, but multiple ADCs and DACs can be connected to a single EIM 104.

Figure 1L:
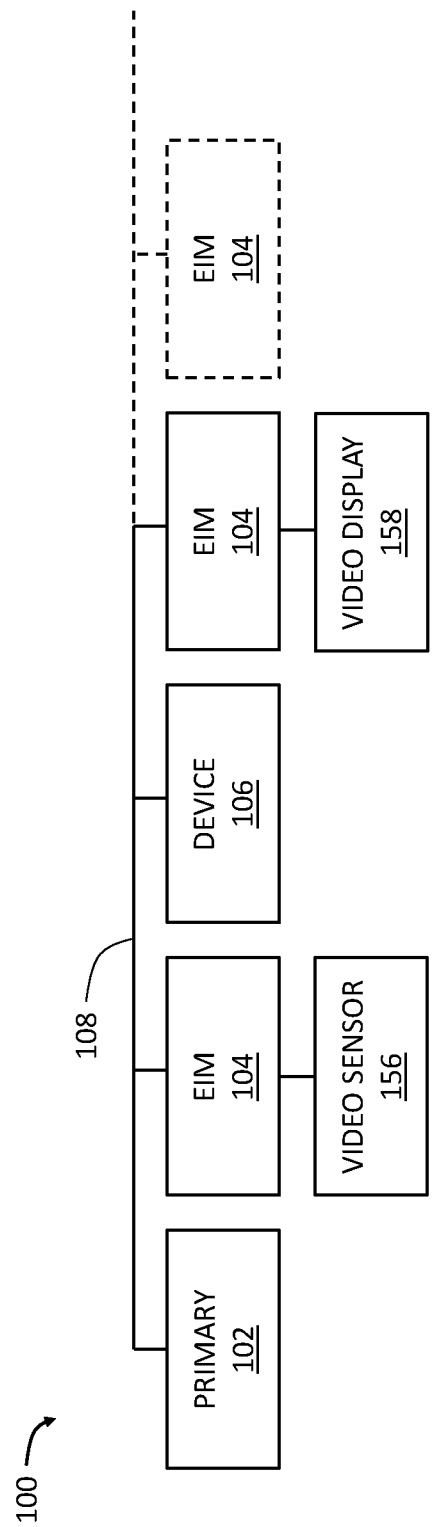

FIG. 1L is a block diagram of another example of a low complexity multidrop network 100. The network 100 of FIG. 1L includes one or more primary devices 102 and EIMs 104 connected as network nodes on a single shared network link 108 that connects video sensor devices 156 and video display devices 158.

Figure 2:
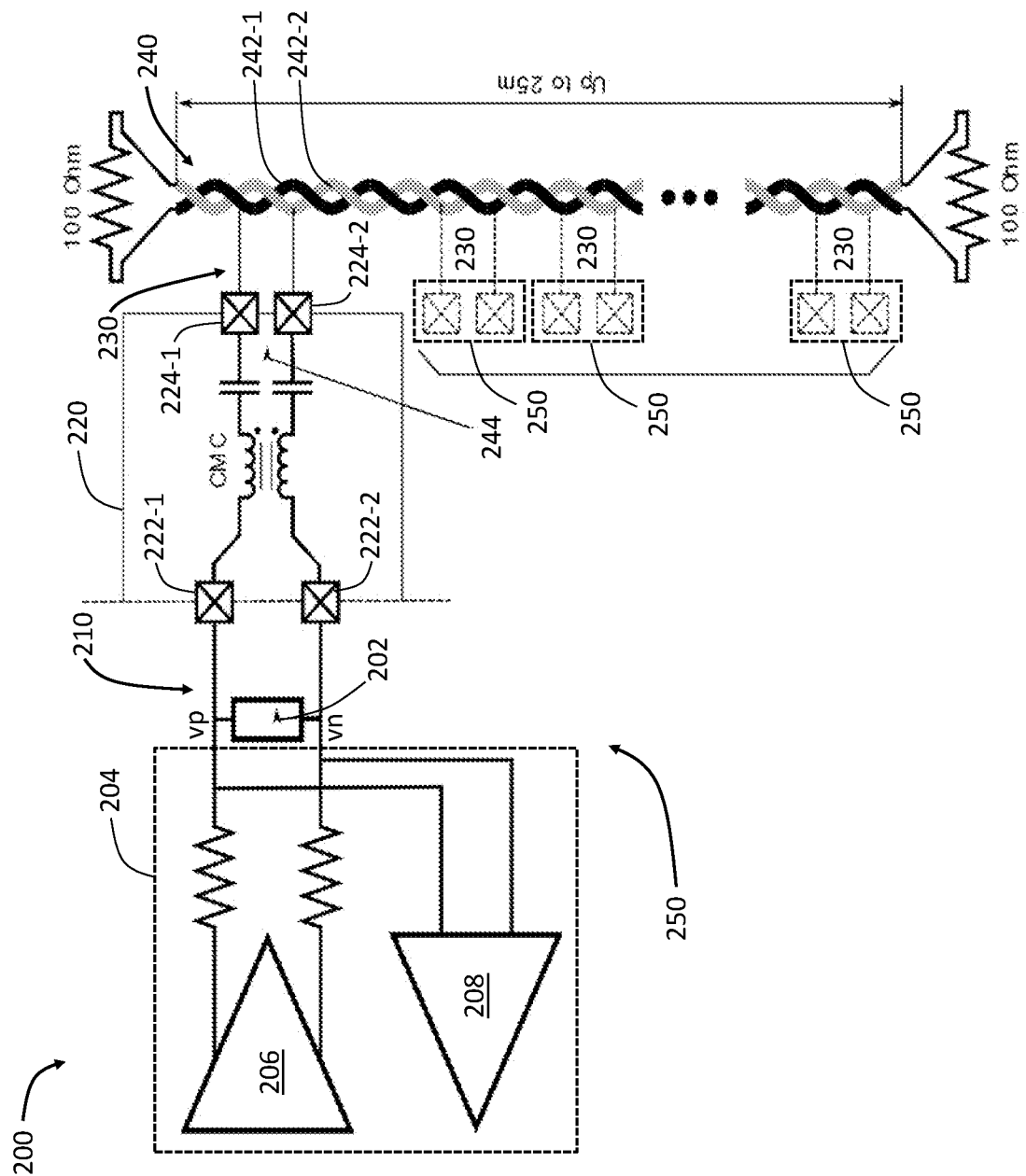
FIG. 2 is a schematic illustration of a multidrop network with a common mode (CM) voltage clamp in accordance with some embodiments of the present disclosure.

FIG. 2 is a schematic illustration of a multidrop network 200 with a CM voltage clamp 202 in accordance with some embodiments of the present disclosure. As shown in FIG. 2, the multidrop network 200 may include a transceiver 204 that includes a transmitter 206 and a receiver 208, coupled to the positive and negative lines, vp and vn, of a differential communication line 210. The CM voltage clamp 202 is also coupled to the positive and negative lines, vp and vn, of the differential communication line 210. The differential communication line 210 of the transceiver 204 is coupled to a shared network link 240 (e.g., a twisted pair cable), possibly via a CM choke 220. As shown in FIG. 2, the CM choke 220 may have a first set of input/output (I/O) pins 222-1 and 222-2 coupled to respective lines of the differential communication line 210 and may further have a second set of I/O pins 224-1 and 224-2 coupled to respective lines of a differential communication line 230. For example, the I/O pin 222-1 may be coupled (e.g., directly connected) to the positive line vp of the differential communication line 210, the I/O pin 222-2 may be coupled (e.g., directly connected) to the negative line vn of the differential communication line 210, the I/O pin 224-1 may be coupled (e.g., directly connected) to the positive line vp of the differential communication line 230, and the I/O pin 224-2 may be coupled (e.g., directly connected) to the negative line vn of the differential communication line 230. Furthermore, the positive line vp of the differential communication line 230 may be coupled (e.g., directly connected) to a first wire 242-1 of the shared network link 240, and the negative line vn of the differential communication line 230 may be coupled (e.g., directly connected) to a second wire 242-1 of the shared network link 240. In some embodiments, the shared network link 240 may be implemented as a twisted wire of the first wire 242-1 and the second wire 242-2, as illustrated in FIG. 2.

Together, the transceiver 204, the CM voltage clamp 202, and the CM choke 220 may be referred to as a node 250 that is coupled to the shared network link 240. FIG. 2 further illustrates that additional nodes 250 may be similarly coupled to the shared network link 240 via respective additional differential communication lines 230 (in FIG. 2, a reference numeral "230" for each of the additional differential communication lines 230 for the additional nodes 250 is shown between positive and negative lines of a given differential communication line 230). Although details of the additional nodes 250 are not shown in FIG. 2 in order to not clutter the drawing, any of the nodes 250 may include any device, such as the transceiver 204, coupled to a respective CM voltage clamp 202, which couples the device to the shared network link 240 (e.g., via the CM choke 220). The multidrop network 200 may be any of the multidrop networks 100 of any of FIGS. 1A-1L, where the shared network link 240 may be the shared network link 108, described above, and where any of the nodes 250 may be/include any of the devices 102, 104, 106, etc., shown in FIGS. 1A-1L.

In some operational conditions of the multidrop network 200, the CM voltage at a point 244 may reach +/− about 100 V relative to the local ECU ground, causing challenges described above. The respective CM voltage clamps 202 which may be included in some of the nodes 250 may help to reduce the CM voltage excursion seen at the transceiver device 204 pins by providing a low CM impedance for CM disturbances above a certain magnitude, while at the same time maintaining a high differential-mode impedance across all conditions. One example of the CM voltage clamp 202 is a CM voltage clamp 300, shown in FIG. 3.

Figure 3:
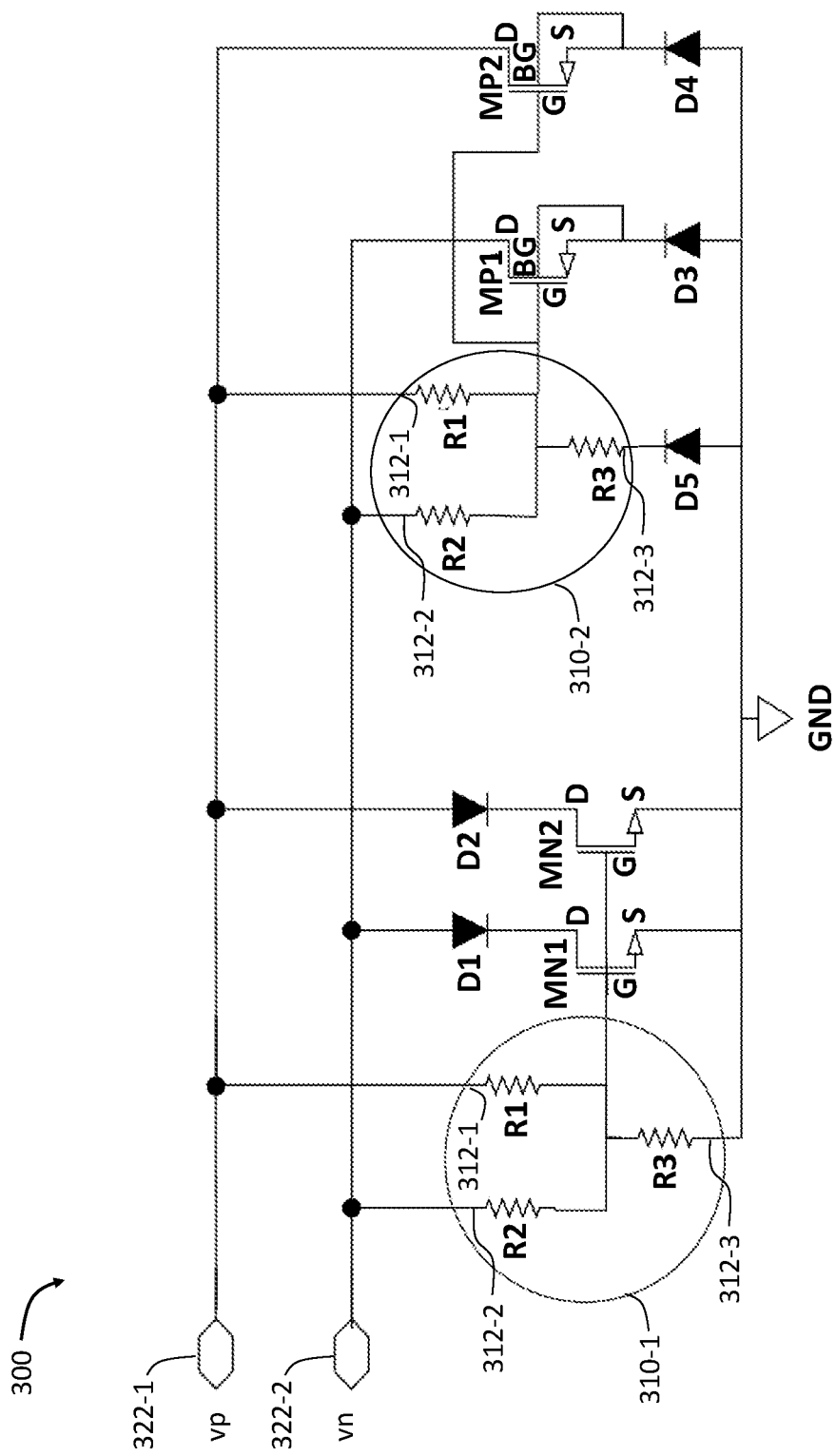
FIG. 3 is an electric circuit diagram of a CM voltage clamp in accordance with some embodiments of the present disclosure.

FIG. 3 is an electric circuit diagram of a CM voltage clamp 300 in accordance with some embodiments of the present disclosure. As shown in FIG. 3, the CM voltage clamp 300 may include a first CM voltage divider 310-1 and a second CM voltage divider 310-2. Each of the CM voltage dividers 310 may include a first branch 312-1, a second branch 312-2, and a third branch 312-3, where the first branch 312-1 includes a first resistor R1, the second branch 312-2 includes a second resistor R2, and a third branch 312-3 includes a third resistor R3. The CM voltage clamp 300 may further include two N-type transistors, e.g., two NMOS transistors designated in FIG. 3 as MN1 and MN2, and two P-type transistors, e.g., two PMOS transistors designated in FIG. 3 as MP1 and MP2. FIG. 3 further illustrates that the CM voltage clamp 300 may further include diodes D1-D5. Source, drain, and gate terminals of various transistors of the CM voltage clamp 300 are labeled in FIG. 3 as "S," "D," and "G," respectively, although they are also clearly identifiable even without the labels because each of the transistors is depicted using it's conventional notation used in electric circuit diagrams. Analogous applies to the diodes D1-D5. Back-gate terminals of the transistors MP1 and MP2 are labeled in FIG. 3 as "BG."

The CM voltage clamp 300 is a common-mode voltage clamp, where the positive and negative lines vp and vn are labeled as being coupled to I/Os 322-1 and 322-2. For example, if the CM voltage clamp 300 is the CM voltage clamp 202 of the multidrop network 200, then the I/O 322-1 may be the point where the positive line of the CM voltage clamp 300 couples to the positive line of the differential communication line 210, and the I/O 322-2 may be the point where the negative line of the CM voltage clamp 300 couples to the negative line of the differential communication line 210. Viewed differently, the positive line vp of the CM voltage clamp 300 may be the positive line of the differential communication line 210, and the negative line vn of the CM voltage clamp 300 may be the negative line of the differential communication line 210.

As shown in FIG. 3, for each of the CM voltage dividers 310, the first branch 312-1 may be coupled (e.g., directly connected) to the positive line vp and the second branch 312-2 may be coupled (e.g., directly connected) to the negative line vn. For example, the first terminal of the transistor R1 of the first CM voltage divider 310-1 and the first terminal of the transistor R1 of the second CM voltage divider 310-2 may be coupled (e.g., directly connected) to the positive line vp of the CM voltage clamp 300, while the first terminal of the transistor R2 of the first CM voltage divider 310-1 and the first terminal of the transistor R2 of the second CM voltage divider 310-2 may be coupled (e.g., directly connected) to the negative line vn of the CM voltage clamp 300. The first terminal of the transistor R1 of the first CM voltage divider 310-1 may be coupled (e.g., directly connected) to the ground (designated as GND in FIG. 3), while the first terminal of the transistor R1 of the second CM voltage divider 310-2 may be coupled to the ground via a diode D5. The second terminals of the transistors R1-R3 of the first CM voltage divider 310-1 may be coupled (e.g., directly connected) to one another and to gate of each of the transistors MN1 and MN2. Similarly, the second terminals of the transistors R1-R3 of the second CM voltage divider 310-2 may be coupled (e.g., directly connected) to one another and to the gate terminal of each of the transistors MP1 and MP2.

Although the resistors R1-R3 of the two CM voltage dividers 310 are designated with the same letters (i.e., R1, R2, and R3), the value of any of the resistors R1-R3 in the first CM voltage divider 310-1 may be the same or different from the value of a resistor designated with the same letter in the second CM voltage divide 310-2. The exact values of the resistors R1-R3 for any of the first and second CM voltage dividers 310 may be selected based on, e.g., the desired voltage division to be achieved and the desired minimum differential resistance presented by the circuit. It may be advantageous that R1 and R2 are selected to have the same value, to avoid introducing differential to common-mode conversion in the circuit. In some embodiments, each of the resistors R1 and R2 may be about 60 kiloOhm (kΩ), while the resistor R3 may be about 6 kΩ, e.g., to divide the CM voltage by 6. However, in other embodiments, these values may be different. In general, the values of the resistors R1 and R2 may be larger than the value of the resistor R3, e.g., 10 times larger, and, in some embodiments, the values of the resistors R1 and R2 may be substantially equal. In some embodiments, the values for the resistors R1-R3 may be selected as, or based on, (R1+R2)/2>>Rdiffin, where Rdiffin is the desired minimum input resistance presented by this circuit, and R3=Vth^2*R1‖R2/(Vcm−Vth^2), where Vth is the threshold voltage of the transistors and Vcm is the common-mode voltage at which the common-mode clamp starts to clamp the common-mode voltage.

As shown in FIG. 3, each of the transistors MN1 and MN2 may have its source terminal coupled (e.g., directly connected) to the ground and may have its drain terminal coupled (e.g., directly connected) to, respectively, the negative line vn and the positive line vp of the CM voltage clamp 300, via respective diodes D1 and D2. In particular, the drain terminal of the transistor MN1 may be coupled (e.g., directly connected) to the cathode of the diode D1 and the anode of the diode D1 may be coupled (e.g., directly connected) to the negative line vn of the CM voltage clamp 300, while the drain terminal of the transistor MN2 may be coupled (e.g., directly connected) to the cathode of the diode D2 and the anode of the diode D2 may be coupled (e.g., directly connected) to the positive line vp of the CM voltage clamp 300. The function of the diodes D1 and D2 may be to prevent the body diode of each of the transistors MN1 and MN2 from conducting during CM voltage events which drop below the ground voltage. For an example where the first CM voltage divider 310-1 divides CM voltage by 6 (e.g., R1 and R2 of the first CM voltage divider 310-1 are each 60 kΩ, while R3 of the first CM voltage divider 310-1 is 6 kΩ), when the CM voltage on the lines vp, vn gets above approximately 6 times greater than a threshold voltage of the transistors MN1 and MN2, the transistors MN1 and MN2 start to conduct current, lowering the dynamic CM impedance of the CM voltage clamp 300. As these transistors are biased in saturation, the differential impedance remains relatively high. For negative CM voltages, the diodes D1 and D2 prevent the body diodes of the transistors MN1 and MN2 from conducting.

The connection to the transistors MP1 and MP2 may be more complex, to float the gate voltage, back-back gate voltage, source and drain voltage of the transistors MP1 and MP2 up for positive CM voltage excursions to prevent diodes turning on which would disturb the differential signal. For the transistors MP1 and MP2, respective diodes D3 and D4 may be coupled to the source terminals instead. As shown in FIG. 3, each of the transistors MP1 and MP2 may have its drain terminal coupled (e.g., directly connected) to, respectively, the negative line vn and the positive line vp of the CM voltage clamp 300 and may have its source terminal coupled to the ground via respective diodes D3 and D4. In particular, each of the source terminal of the transistor MP1 and the back gate terminal of the transistor MP1 may be coupled (e.g., directly connected) to the cathode of the diode D3 and the anode of the diode D3 may be coupled (e.g., directly connected) to the ground of the CM voltage clamp 300. Similarly, each of the source terminal of the transistor MP2 and the back gate terminal of the transistor MP2 may be coupled (e.g., directly connected) to the cathode of the diode D4 and the anode of the diode D4 may be coupled (e.g., directly connected) to the ground. The first terminal of the resistor R3 of the second CM voltage divide 310-2 may, similarly, be coupled to the cathode of the diode D5 and the anode of the diode D5 may be coupled (e.g., directly connected) to the ground. For an example where the second CM voltage divider 310-2 divides CM voltage by 6 (e.g., R1 and R2 of the second CM voltage divider 310-2 are each 60 kΩ, while R3 of the second CM voltage divider 310-2 is 6 kΩ), when the CM voltage on the lines vp, vn drops below approximately 6 times than a threshold voltage of the transistors MP1 and MP2, the transistors MP1 and MP2 start to conduct current, lowering the dynamic CM impedance of the CM voltage clamp 300. For positive CM voltages, the diodes D3, D4, and D5 ensure that although the body diodes of the transistors MP1 and MP2 will be forward biased, there will be no current path to the local ground GND. The diode D5 may be particularly helpful to allow the gate voltage of the transistors MP1 and MP2 follow the source and back-gate voltage, and to prevent damage to these transistors.

Because the transistors MN1 and MN2 and the transistors MP1 and MP2 have an attenuated version of the drain to source voltage connected to their gate terminals, whenever these transistors are conducting, they are biased in saturation, and, as a result, the differential impedance looking into the circuit is determined by the 2*RDS of the devices in saturation, where RDS is a drain-source resistance of a given one of these transistors. The value RDS is a relatively high value, e.g., on the order of 100 kOhms, and thus does not affect the differential signal.

Figure 4:
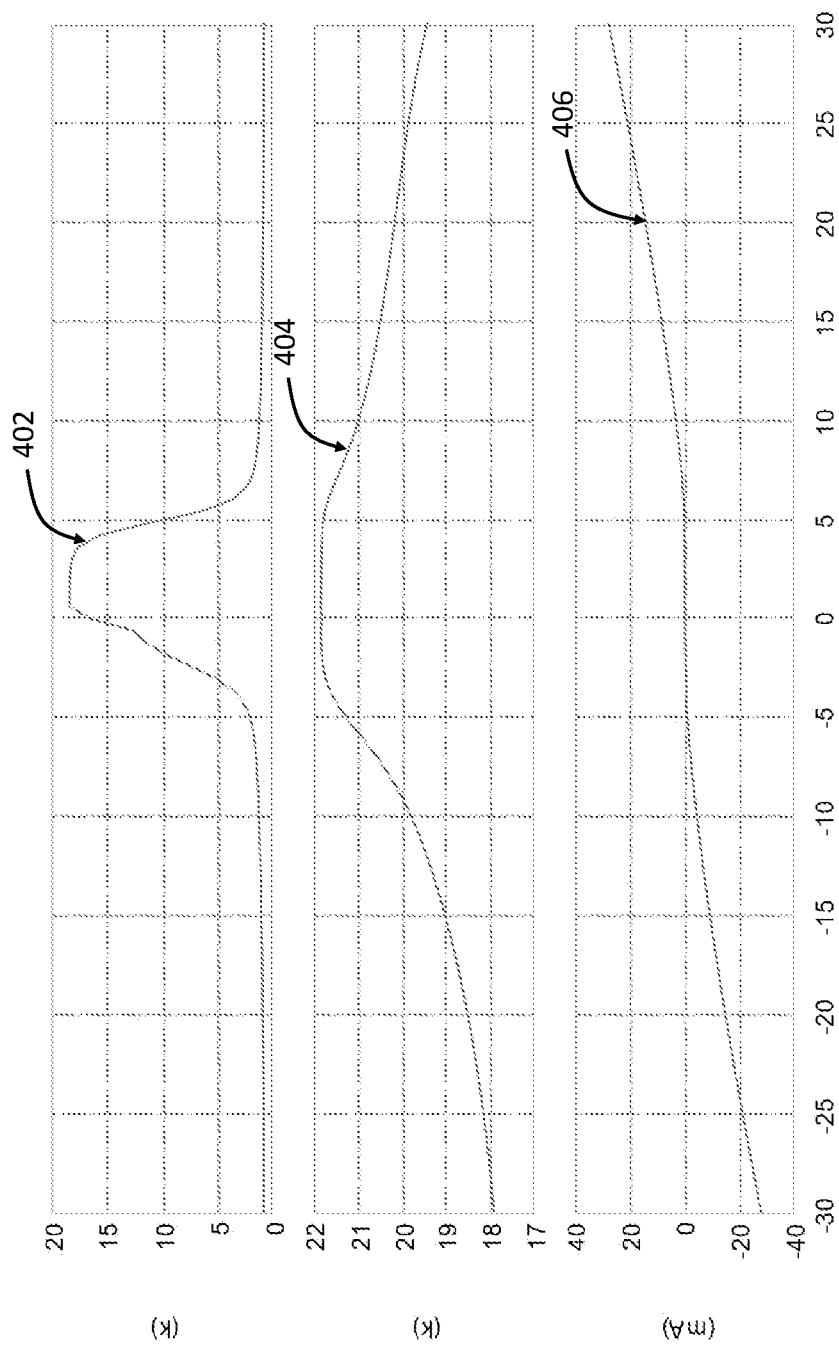
FIG. 4 illustrates a simulation result of direct-current (DC) characteristics of the CM voltage clamp of FIG. 3 in accordance with some embodiments of the present disclosure.

FIG. 4 illustrates a simulation result of DC characteristics of the CM voltage clamp 300 in accordance with some embodiments of the present disclosure. FIG. 4 illustrates three graphs, each having a horizontal axis measuring the CM voltage (DC voltage) at the pins 322-1 and 322-2 of the CM voltage clamp 300 swept from −30V to 30V. A curve 402 of the first graph illustrates dependence of a CM impedance (Rcmdyn) of the CM voltage clamp 300, measured in kΩ along the vertical axis of the first graph, as a function of the CM voltage. The curve 402 shows that the CM impedance it drops down to about 1.5 kΩ at the CM voltage around +1-7V. A curve 404 of the second graph illustrates dependence of a differential impedance (Rdiff) of the CM voltage clamp 300, measured in kΩ along the vertical axis of the second graph, as a function of the CM voltage. The curve 404 shows that the differential impedance stays much higher than the line impedance of 50 Ohms across the full +/−30V CM range of the CM voltage. A curve 406 of the third graph illustrates dependence of a CM current (icm) flowing into the CM voltage clamp 300, measured in milliAmpere (mA) along the vertical axis of the first graph, as a function of the CM voltage. The third graph of FIG. 4 is an alternative illustration of the strength of the CM clamping action of the circuit.

Figure 5:
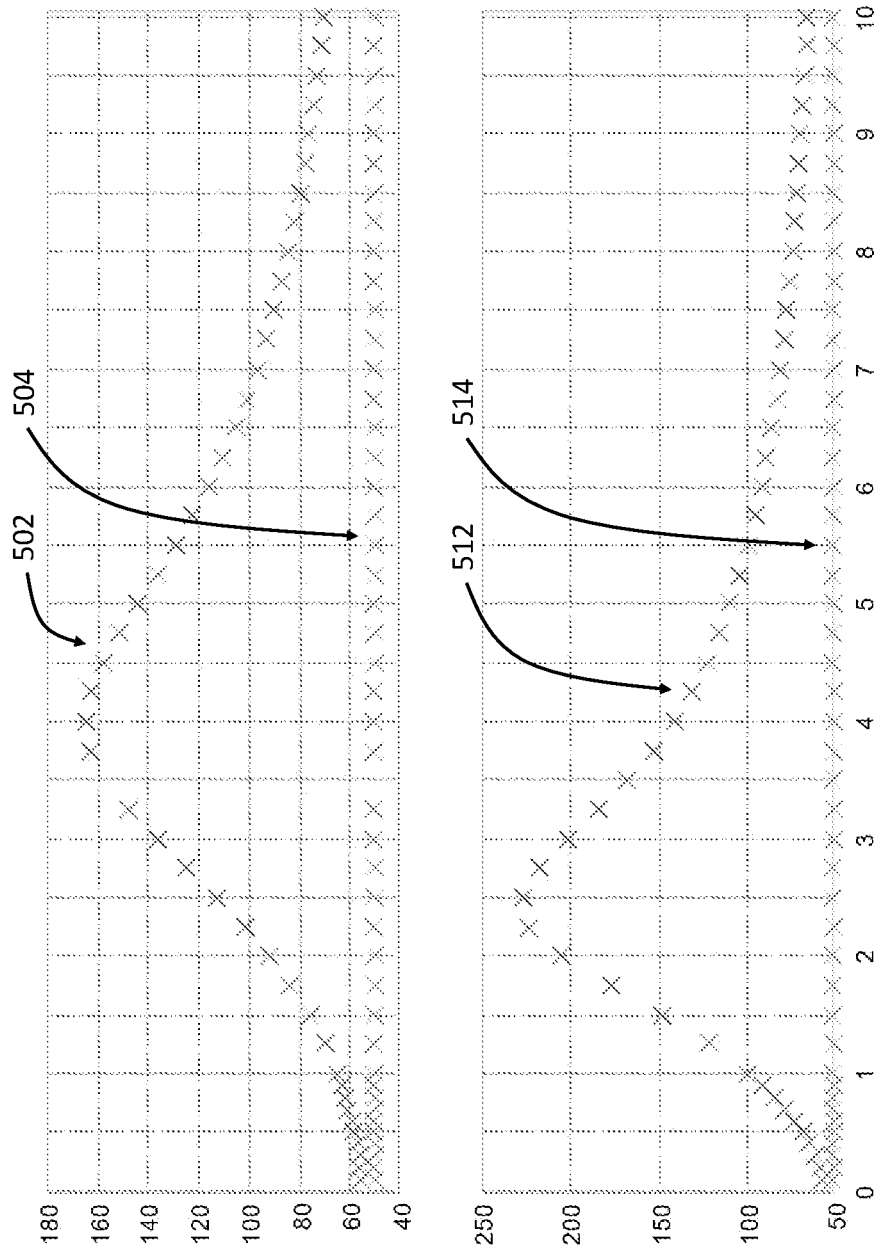
FIG. 5 illustrates a first simulation result of direct power injection (DPI) testing of the CM voltage clamp of FIG. 3 in accordance with some embodiments of the present disclosure.

FIG. 5 illustrates a first simulation result of direct power injection (DPI) testing of the CM voltage clamp 300 in accordance with some embodiments of the present disclosure. In this simulation, an RF signal representing an RF interferer is injected via a DPI coupling network into the series connection of a CM choke (e.g., the CM choke 220) and the CM voltage clamp (e.g., the CM voltage clamp 202, e.g., the CM voltage clamp 300). Then the RF interferer signal is tuned such that 50V peak-to-peak voltage is developed across the CM voltage clamp 202 (e.g., measured between vp or vn and the local ground of the CM voltage clamp 202), then the CM voltage clamp 202 is removed and the same simulation is repeated, again measuring peak-to-peak voltage between vp or vn and the local ground of the CM voltage clamp 202. FIG. 5 illustrates two graphs, each having a horizontal axis measuring, in MHz, the frequency of the RF signal being injected into the network 200 via DPI, and each having a vertical axis measuring, in V, the peak-to-peak voltage between vp or vn and the local ground of the CM voltage clamp 202. A curve 502 of the first graph illustrates dependence of the peak-to-peak voltage on the frequency of the RF interferer without the CM voltage clamp 202, while a curve 504 of the first graph illustrates dependence of the peak-to-peak voltage on the frequency of the RF interferer for the multidrop network 200 with the CM voltage clamp 202. Similarly, a curve 512 of the second graph illustrates dependence of the peak-to-peak voltage on the frequency of the RF interferer for the multidrop network 200 without the CM voltage clamp 202, while a curve 514 of the second graph illustrates dependence of the peak-to-peak voltage on the frequency of the RF interferer for the multidrop network 200 with the CM voltage clamp 202. The first and second graphs differ in the value of common-mode choke (e.g., the CM choke 220) used for the simulation—the first graph is the simulation result with a 100 uH value common-mode choke, the second graph the simulation result with a 200 uH value common-mode choke. Both the first and the second graphs of FIG. 5 illustrate between a 3 and 4× reduction in the CM voltage when the CM voltage clamp 202 is used around the resonant frequency of the CM choke 220 as it resonates with the transceiver capacitance.

Figure 6:
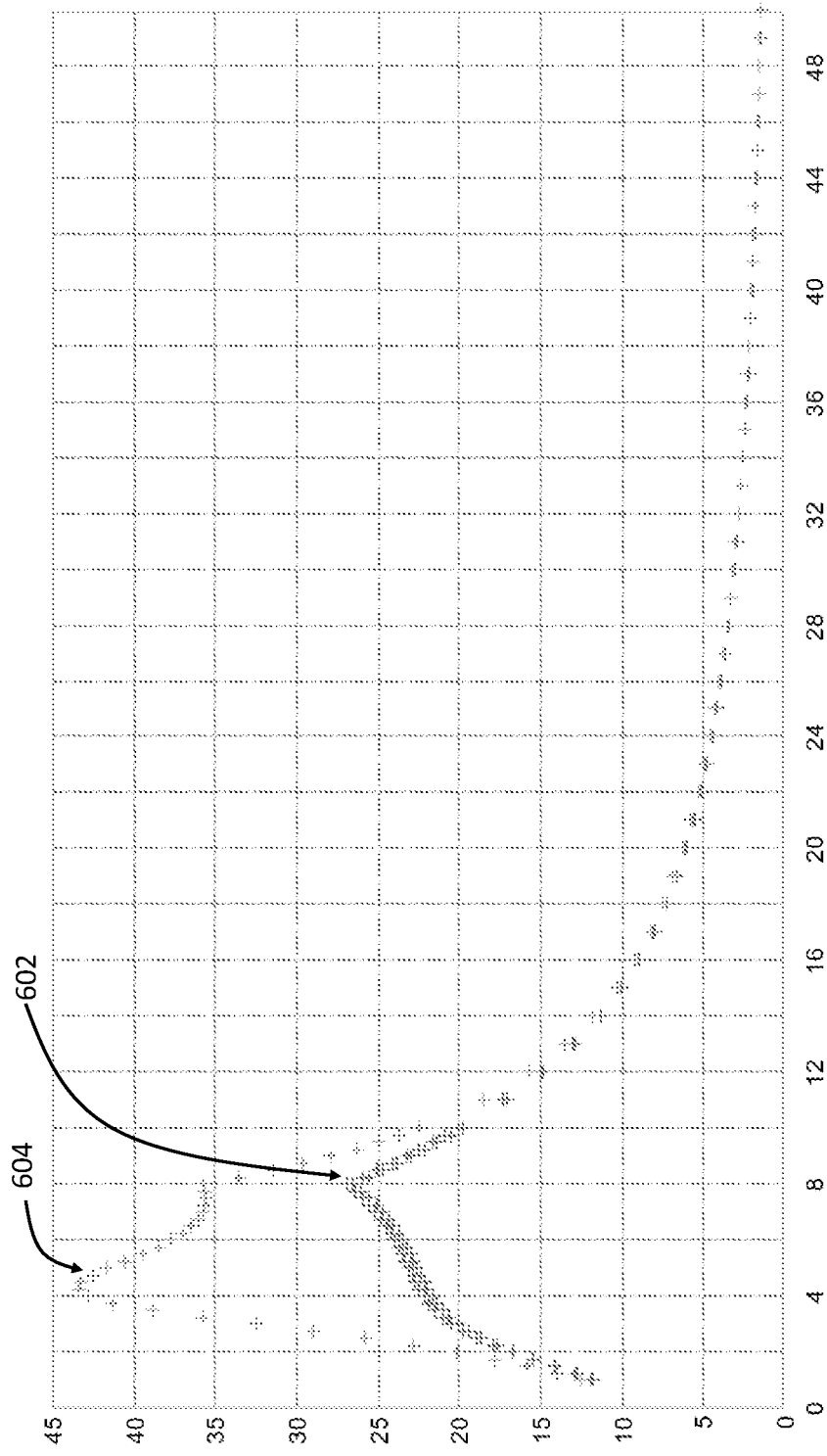
FIG. 6 illustrates a second simulation result of DPI testing of the CM voltage clamp of FIG. 3 in accordance with some embodiments of the present disclosure.
Figure 7:
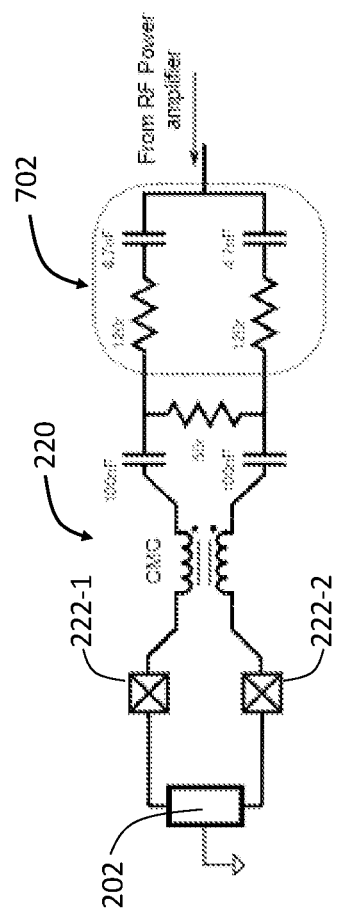
FIG. 7 illustrates a DPI injection network in accordance with some embodiments of the present disclosure.

FIG. 6 illustrates a second simulation result of DPI testing of the CM voltage clamp 300 in accordance with some embodiments of the present disclosure. In this simulation, an Open Alliance Class IV DPI RF signal representing an RF interferer is injected into the CM choke 220 of the network 200 (e.g., as shown in FIG. 7), with the frequency of the RF signal measured along the horizontal axis, similar to FIG. 5, in units of MHz, and the peak-to-peak voltage CM voltage between vp or vn and the local ground of the CM voltage clamp 202 measured along the vertical axis, similar to FIG. 5, in units of V. A curve 604 of FIG. 6 illustrates dependence of the peak-to-peak voltage on the frequency of the RF interferer of the DPI injection network without the CM voltage clamp, while a curve 602 of FIG. 6 illustrates dependence of the peak-to-peak voltage on the frequency of the RF interferer for the multidrop network 200 with the CM voltage clamp 202. FIG. 6 illustrates a reduction in the worst-case peak-to-peak interferer amplitude from 43V to 27V.

An example DPI injection network that may be used to generate the results of FIG. 5 and FIG. 6 is shown as a network 702 in FIG. 7. The DPI injection network 702 may be intended to emulate the type of CM disturbance that one would find in a real network. How the DPI injection network 702 is connected to the CM choke 220 and the CM voltage clamp 202 is also illustrated in FIG. 7.

Figure 8:
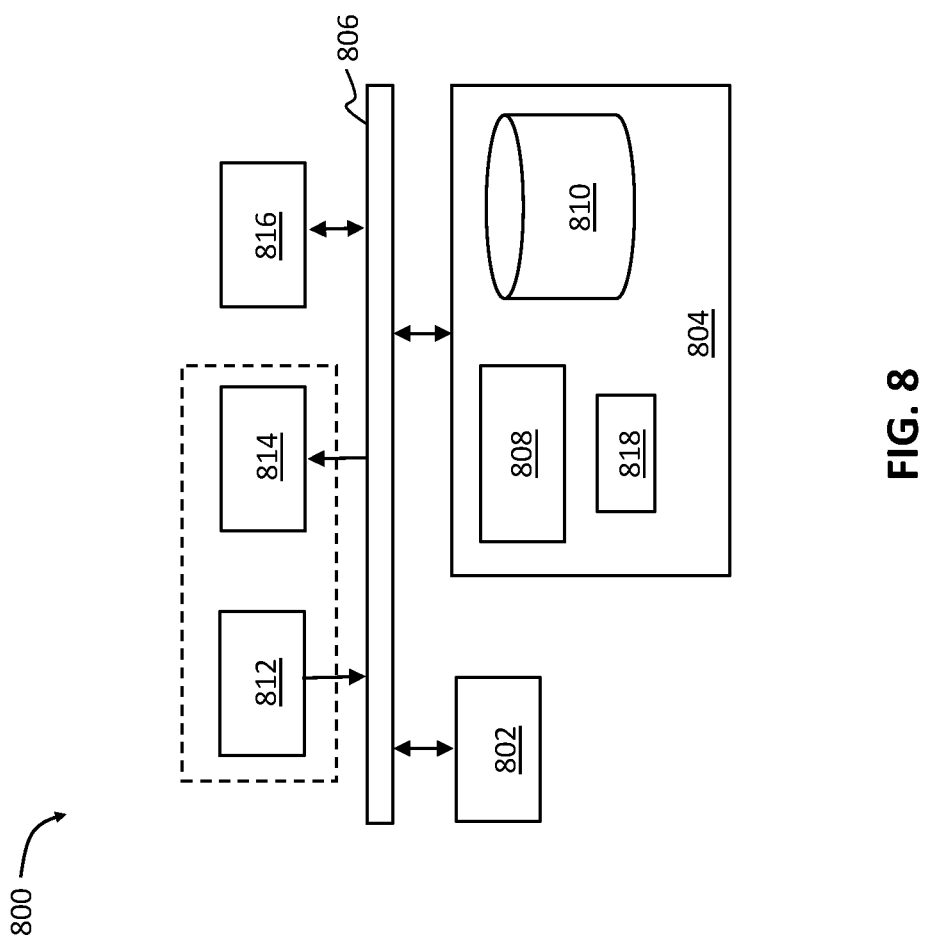
FIG. 8 provides a block diagram illustrating an example data processing system that may be used in a multidrop network with a CM voltage clamp in accordance with some embodiments of the present disclosure.

FIG. 8 provides a block diagram illustrating an example data processing system 800 that may be used in a multidrop network with a CM voltage clamp (e.g., the multidrop network 200 with the CM voltage clamp 202/300) in accordance with some embodiments of the present disclosure. Such a data processing system could be configured to, e.g., function as any logic configured to control various aspects of a multidrop network with a CM voltage clamp, as disclosed herein.

As shown in FIG. 8, the data processing system 800 may include at least one processor 802 coupled to memory elements 804 through a system bus 806. As such, the data processing system may store program code within memory elements 804. Further, the processor 802 may execute the program code accessed from the memory elements 804 via a system bus 806. In one aspect, the data processing system may be implemented as a computer that is suitable for storing and/or executing program code. It should be appreciated, however, that the data processing system 800 may be implemented in the form of any system including a processor and a memory that is capable of performing the functions described within the present disclosure.

The memory elements 804 may include one or more physical memory devices such as, for example, local memory 808 and one or more bulk storage devices 810. The local memory may refer to RAM or other non-persistent memory device(s) generally used during actual execution of the program code. A bulk storage device may be implemented as a hard drive or other persistent data storage device. The processing system 800 may also include one or more cache memories (not shown) that provide temporary storage of at least some program code in order to reduce the number of times program code must be retrieved from the bulk storage device 810 during execution.

I/O devices depicted in FIG. 8 as an input device 812 and an output device 814, optionally, can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 812 and the output device 814). An example of such a combined device is a touch sensitive display, also sometimes referred to as a "touch screen display" or simply "touch screen". In such an embodiment, input to the device may be provided by a movement of a physical object, such as e.g., a stylus or a finger of a user, on or near the touch screen display. When used in a multidrop network according to various embodiments of the present disclosure, e.g. in the multidrop network 200 shown in FIG. 2, the input device 812 may be used to receive input, e.g., as provided by a user, and to configure the multidrop network 200 in accordance with the user input.

A network adapter 816 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 800, and a data transmitter for transmitting data from the data processing system 800 to said systems, devices and/or networks. Modems, cable modems, and Ethernet cards are examples of different types of network adapter that may be used with the data processing system 800.

When used in a multidrop network according to various embodiments of the present disclosure, e.g. in the multidrop network 200 shown in FIG. 2, the network adapter 816 may be used to receive input from other systems, computer systems, remote network devices, and/or remote storage devices through intervening private or public networks, and to configure the multidrop network 200 in accordance with the received input. For example, the network adapter 816 may be configured to receive examples of input as described with reference to the input received by the input device 812 from the user, except that now it would be received from other systems, computer systems, remote network devices, and/or remote storage devices through intervening private or public networks.

As pictured in FIG. 8, the memory elements 804 may store an application 818. In various embodiments, the application 818 may be stored in the local memory 808, the one or more bulk storage devices 810, or apart from the local memory and the bulk storage devices. It should be appreciated that the data processing system 800 may further execute an operating system (not shown in FIG. 8) that can facilitate execution of the application 818. The application 818, being implemented in the form of executable program code, can be executed by the data processing system 800, e.g., by the processor 802. Responsive to executing the application, the data processing system 800 may be configured to perform one or more operations or method steps described herein.

Principles and advantages discussed herein can be used in any device or system to implement a clamping scheme in a multidrop network. It is to be understood that not necessarily all objects or advantages mentioned herein may be achieved in accordance with any embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the present drawings may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present drawings may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), FPGAs, and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be distributed or consolidated in any suitable manner. Along similar design alternatives, any of the illustrated components, modules, and elements of the present drawings may be combined in various possible configurations, all of which are clearly within the broad scope of the present disclosure. In certain cases, it may be easier to describe one or more of the functionalities of a given set of flows by only referencing a limited number of electrical elements. It should be appreciated that the electrical circuits of the figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in the present disclosure references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the apparatus, device, or system described above may also be implemented with respect to the method or processes of using or operating said apparatus device, or system, and specifics in the examples provided for any of the apparatus, device, or system described herein may be used anywhere in corresponding methods or processes, and vice versa.

Example 1 provides a CM voltage clamp circuit for a node of a multidrop network, the CM voltage clamp circuit including a first CM voltage divider (e.g., the first CM voltage divider 310-1) coupled (e.g., directly connected) to a first line (e.g., vn) and a second line (e.g., vp) of a differential link; a second CM voltage divider (e.g., the second CM voltage divider 310-2) coupled (e.g., directly connected) to the first line and the second line of the differential link; a first N-type transistor (e.g., MN1) coupled to the first line of the differential link via a first diode (D1), and further coupled (e.g., directly connected) to the first CM voltage divider; a second N-type transistor (e.g., MN2) coupled to the second line of the differential link via a second diode (D2), and further coupled (e.g., directly connected) to the first CM voltage divider; a first P-type transistor (e.g., MP1) coupled to a ground signal of the node via a third diode (D3), and further coupled (e.g., directly connected) to the second CM voltage divider; and a second P-type transistor (e.g., MP2) coupled to the ground signal of the node via a fourth diode (D4) and further coupled (e.g., directly connected) to the second CM voltage divider.

Example 2 provides the CM voltage clamp circuit according to example 1, where the first CM voltage divider is further coupled (e.g., directly connected) to the ground signal.

Example 3 provides the CM voltage clamp circuit according to examples 1 or 2, where the first CM voltage divider includes a first resistor, a second resistor, and a third resistor; a first terminal of the first resistor is coupled (e.g., directly connected) the second line of the differential link; a first terminal of the second resistor is coupled (e.g., directly connected) the first line of the differential link; the first CM voltage divider is further coupled (e.g., directly connected) to the ground signal by having a first terminal of the third resistor coupled (e.g., directly connected) to the ground signal; and a second terminal of the first resistor, a second terminal of the second resistor, and a second terminal of the third resistor are coupled (e.g., directly connected) to one another.

Example 4 provides the CM voltage clamp circuit according to example 3, where the first N-type transistor is coupled to the first CM voltage divider by having a first terminal (e.g., gate/base terminal) of the first N-type transistor being coupled (e.g., directly connected) to each of the second terminal of the first resistor, the second terminal of the second resistor, and the second terminal of the third resistor of the first CM voltage divider.

Example 5 provides the CM voltage clamp circuit according to examples 3 or 4, where the second N-type transistor is coupled to the first CM voltage divider by having a first terminal (e.g., gate/base terminal) of the second N-type transistor being coupled (e.g., directly connected) to each of the second terminal of the first resistor, the second terminal of the second resistor, and the second terminal of the third resistor of the first CM voltage divider.

Example 6 provides the CM voltage clamp circuit according to any one of examples 1-5, where a first terminal (e.g., gate/base terminal) of the first N-type transistor is coupled (e.g., directly connected) to a first terminal (e.g., gate/base terminal) of the second N-type transistor.

Example 7 provides the CM voltage clamp circuit according to any one of examples 1-6, where the first N-type transistor is coupled to the first line of the differential link via the first diode by having a second terminal (e.g., drain/collector terminal) of the first N-type transistor being coupled (e.g., directly connected) to a cathode of the first diode and having an anode of the first diode being coupled (e.g., directly connected) to the first line of the differential link.

Example 8 provides the CM voltage clamp circuit according to any one of examples 1-7, where the second N-type transistor is coupled to the second line of the differential link via the second diode by having a second terminal (e.g., drain/collector terminal) of the second N-type transistor being coupled (e.g., directly connected) to a cathode of the second diode and having an anode of the second diode being coupled (e.g., directly connected) to the second line of the differential link.

Example 9 provides the CM voltage clamp circuit according to any one of examples 1-8, where a third terminal (e.g., source/emitter terminal) of the first N-type transistor is coupled (e.g., directly connected) to the ground signal.

Example 10 provides the CM voltage clamp circuit according to any one of examples 1-9, where a third terminal (e.g., source/emitter terminal) of the second N-type transistor is coupled (e.g., directly connected) to the ground signal.

Example 11 provides the CM voltage clamp circuit according to any one of examples 1-10, where the second CM voltage divider is further coupled to the ground signal via a fifth diode (D5).

Example 12 provides the CM voltage clamp circuit according to example 11, where the second CM voltage divide is further coupled to the ground signal via the fifth diode includes the second CM voltage divider being coupled (e.g., directly connected) to a cathode of the fifth diode and having an anode of the fifth diode being coupled (e.g., directly connected) to the ground signal.

Example 13 provides the CM voltage clamp circuit according to any one of examples 1-12, where the second CM voltage divider includes a first resistor, a second resistor, and a third resistor; a first terminal of the first resistor is coupled (e.g., directly connected) the second line of the differential link; a first terminal of the second resistor is coupled (e.g., directly connected) the first line of the differential link; the second CM voltage divider is further coupled to the ground signal via a fifth diode (D5) by having a first terminal of the third resistor coupled (e.g., directly connected) to a cathode of the fifth diode and having an anode of the fifth diode coupled (e.g., directly connected) the ground signal; and a second terminal of the first resistor, a second terminal of the second resistor, and a second terminal of the third resistor are coupled (e.g., directly connected) to one another.

Example 14 provides the CM voltage clamp circuit according to example 13, where the first P-type transistor is coupled to the second CM voltage divider by having a first terminal (e.g., gate/base terminal) of the first P-type transistor being coupled (e.g., directly connected) to each of the second terminal of the first resistor, the second terminal of the second resistor, and the second terminal of the third resistor of the second CM voltage divider.

Example 15 provides the CM voltage clamp circuit according to examples 13 or 14, where the second P-type transistor is coupled to the second CM voltage divider by having a first terminal (e.g., gate/base terminal) of the second P-type transistor being coupled (e.g., directly connected) to each of the second terminal of the first resistor, the second terminal of the second resistor, and the second terminal of the third resistor of the second CM voltage divider.

Example 16 provides the CM voltage clamp circuit according to any one of examples 1-15, where a first terminal (e.g., gate/base terminal) of the first P-type transistor is coupled (e.g., directly connected) to a first terminal (e.g., gate/base terminal) of the second P-type transistor.

Example 17 provides the CM voltage clamp circuit according to any one of examples 1-16, where the first P-type transistor is coupled to the first line of the differential link by having a second terminal (e.g., drain/collector terminal) of the first P-type transistor being coupled (e.g., directly connected) to the first line of the differential link.

Example 18 provides the CM voltage clamp circuit according to any one of examples 1-17, where the second P-type transistor is coupled to the second line of the differential link by having a second terminal (e.g., drain/collector terminal) of the second P-type transistor being coupled (e.g., directly connected) to the second line of the differential link.

Example 19 provides the CM voltage clamp circuit according to any one of examples 1-18, where the first P-type transistor is coupled to the ground signal via the third diode by having a third terminal (e.g., source/emitter terminal) of the first P-type transistor being coupled (e.g., directly connected) to a cathode of the third diode and by having an anode of the third diode being coupled (e.g., directly connected) to the ground signal.

Example 20 provides the CM voltage clamp circuit according to any one of examples 1-19, where the first P-type transistor is coupled to the ground signal via the third diode by having a back-gate terminal of the first P-type transistor being coupled (e.g., directly connected) to a cathode of the third diode and by having an anode of the third diode being coupled (e.g., directly connected) to the ground signal.

Example 21 provides the CM voltage clamp circuit according to any one of examples 1-20, where the second P-type transistor is coupled to the ground signal via the fourth diode by having a third terminal (e.g., source/emitter terminal) of the second P-type transistor being coupled (e.g., directly connected) to a cathode of the fourth diode and by having an anode of the fourth diode being coupled (e.g., directly connected) to the ground signal.

Example 22 provides the CM voltage clamp circuit according to any one of examples 1-21, where the second P-type transistor is coupled to the ground signal via the fourth diode by having a back-gate terminal of the second P-type transistor being coupled (e.g., directly connected) to a cathode of the fourth diode and by having an anode of the fourth diode being coupled (e.g., directly connected) to the ground signal.

Example 23 provides an integrated circuit (IC), including a transceiver having a first input or output (I/O) terminal coupled (e.g., directly connected) to a first line (e.g., vn) of a differential link, and further having a second I/O terminal coupled (e.g., directly connected) to a second line (e.g., vp) of the differential link; and a clamp circuit coupled (e.g., directly connected) to the first I/O terminal and the second I/O terminal of the transceiver (i.e., the clamp circuit is coupled, e.g., directly connected, to the first line and the second line of the differential link), where the clamp circuit includes a first CM voltage divider (e.g., the first CM voltage divider 310-1) coupled (e.g., directly connected) to the first line and the second line of the differential link; a second CM voltage divider (e.g., the second CM voltage divider 310-2) coupled (e.g., directly connected) to the first line and the second line of the differential link; a first N-type transistor (e.g., MN1) coupled to the first line of the differential link via a first diode (D1), and further coupled (e.g., directly connected) to the first CM voltage divider; a second N-type transistor (e.g., MN2) coupled to the second line of the differential link via a second diode (D2), and further coupled (e.g., directly connected) to the first CM voltage divider; a first P-type transistor (e.g., MP1) coupled to a ground signal of the node via a third diode (D3), and further coupled (e.g., directly connected) to the second CM voltage divider; and a second P-type transistor (e.g., MP2) coupled to the ground signal of the node via a fourth diode (D4) and further coupled (e.g., directly connected) to the second CM voltage divider.

Example 24 provides the IC according to example 23, where the transceiver and the clamp circuit are provided over a single substrate.

Example 25 provides a vehicle, including a shared network link; a plurality of nodes coupled to the shared network link; and a CM voltage clamp coupled to one of the plurality of nodes, the CM voltage clamp including first and second CM voltage dividers, two N-type transistors having their gate terminals coupled to the first CM voltage divider, two P-type transistors having their gate terminals coupled to the second CM voltage divider, and five diodes coupled to, respectively, a drain terminal of one of the two N-type transistors, a drain terminal of another one of the two N-type transistors, a source terminal of one of the two P-type transistors, a source terminal of another one of the two P-type transistors, and the second CM voltage divider.

Example 26 provides the vehicle according to example 25, where the CM voltage clamp is one of a plurality of CM voltage clamps, each of the plurality of CM voltage clamps coupled to a corresponding one of the plurality of nodes.

The invention claimed is:

1. A common mode (CM) voltage clamp circuit for a node of a multidrop network, the CM voltage clamp circuit comprising:
   a first CM voltage divider including a first resistor in parallel with a second resistor, the first CM voltage divider coupled to a first line and a second line of a differential link;
   a second CM voltage divider including a first resistor in parallel with a second resistor, the second CM voltage divider coupled to the first line and the second line of the differential link;
   a first N-type transistor coupled to the first line of the differential link via a first diode on a drain terminal of the first N-type transistor, and further coupled to the first CM voltage divider via a gate terminal of the first N-type transistor;
   a second N-type transistor coupled to the second line of the differential link via a second diode on a drain terminal of the second N-type transistor, and further coupled to the first CM voltage divider via a gate terminal of the second N-type transistor;
   a first P-type transistor coupled to a ground signal via a third diode on a source terminal of the first P-type transistor, and further coupled to the second CM voltage divider via a back-gate terminal of the first P-type transistor; and
   a second P-type transistor coupled to the ground signal via a fourth diode on a source terminal of the second P-type transistor, and further coupled to the second CM voltage divider via a back-gate terminal of the second P-type transistor,
   wherein the second CM voltage divider is further coupled to the ground signal via a fifth diode.

2. The CM voltage clamp circuit according to claim 1, wherein the first CM voltage divider is further coupled to the ground signal.

3. The CM voltage clamp circuit according to claim 1, wherein:
   the first CM voltage divider further includes a third resistor,
   a first terminal of the first resistor is coupled the second line of the differential link,
   a first terminal of the second resistor is coupled the first line of the differential link,
   the first CM voltage divider is further coupled to the ground signal by having a first terminal of the third resistor coupled to the ground signal, and
   a second terminal of the first resistor, a second terminal of the second resistor, and a second terminal of the third resistor are coupled to one another.

4. The CM voltage clamp circuit according to claim 3, wherein the first N-type transistor is coupled to the first CM voltage divider by having a first terminal corresponding to the gate terminal of the first N-type transistor being coupled to each of the second terminal of the first resistor, the second terminal of the second resistor, and the second terminal of the third resistor of the first CM voltage divider.

5. The CM voltage damp circuit according to claim 3, wherein the second N-type transistor is coupled to the first CM voltage divider by having a first terminal corresponding to the gate terminal of the second N-type transistor being coupled to each of the second terminal of the first resistor, the second terminal of the second resistor, and the second terminal of the third resistor of the first CM voltage divider.

6. The CM voltage clamp circuit according to claim 1, wherein the first N-type transistor is coupled to the first line of the differential link via the first diode by having a second terminal corresponding to the drain terminal of the first N-type transistor being coupled to a cathode of the first diode and having an anode of the first diode being coupled to the first line of the differential link.

7. The CM voltage clamp circuit according to claim 1, wherein the second N-type transistor is coupled to the second line of the differential link via the second diode by having a second terminal corresponding to the drain terminal of the second N-type transistor being coupled to a cathode of the second diode and having an anode of the second diode being coupled to the second line of the differential link.

8. The CM voltage clamp circuit according to claim 1, wherein the second CM voltage divider is further coupled to the ground signal via the fifth diode includes the second CM voltage divider being coupled to a cathode of the fifth diode and having an anode of the fifth diode being coupled to the ground signal.

9. The CM voltage clamp circuit according to claim 1, wherein:
   the second CM voltage divider further includes a third resistor,
   a first terminal of the first resistor is coupled the second line of the differential link,
   a first terminal of the second resistor is coupled the first line of the differential link,
   the second CM voltage divider is further coupled to the ground signal via the fifth diode by having a first terminal of the third resistor coupled to a cathode of the fifth diode and having an anode of the fifth diode coupled the ground signal, and
   a second terminal of the first resistor, a second terminal of the second resistor, and a second terminal of the third resistor are coupled to one another.

10. The CM voltage clamp circuit according to claim 9, wherein the first P-type transistor is coupled to the second CM voltage divider by having a first terminal corresponding to the gate terminal of the first P-type transistor being coupled to each of the second terminal of the first resistor, the second terminal of the second resistor, and the second terminal of the third resistor of the second CM voltage divider.

11. The CM voltage clamp circuit according to claim 9, wherein the second P-type transistor is coupled to the second CM voltage divider by having a first terminal corresponding to the gate terminal of the second P-type transistor being coupled to each of the second terminal of the first resistor, the second terminal of the second resistor, and the second terminal of the third resistor of the second CM voltage divider.

12. The CM voltage clamp circuit according to claim 1, wherein the first P-type transistor is coupled to the ground signal via the third diode by having a third terminal corresponding to the source terminal of the first P-type transistor being coupled to a cathode of the third diode and by having an anode of the third diode being coupled to the ground signal.

13. The CM voltage clamp circuit according to claim 1, wherein the first P-type transistor is coupled to the ground signal via the third diode by having the back-gate terminal of the first P-type transistor being coupled to a cathode of the third diode and by having an anode of the third diode being coupled to the ground signal.

14. The CM voltage clamp circuit according to claim 1, wherein the second P-type transistor is coupled to the ground signal via the fourth diode by having a third terminal corresponding to the source terminal of the second P-type transistor being coupled to a cathode of the fourth diode and by having an anode of the fourth diode being coupled to the ground signal.

15. The CM voltage clamp circuit according to claim 1, wherein the second P-type transistor is coupled to the ground signal via the fourth diode by having the back-gate terminal of the second P-type transistor being coupled to a cathode of the fourth diode and by having an anode of the fourth diode being coupled to the ground signal.

16. An integrated circuit (IC), comprising:
  a transceiver having a first input or output (I/O) terminal coupled to a first line of a differential link, and further having a second I/O terminal coupled to a second line of the differential link; and
  a clamp circuit coupled to the first I/O terminal and the second I/O terminal of the transceiver,
  wherein the clamp circuit includes:
    a first CM voltage divider including a first resistor in parallel with a second resistor, the first CM voltage divider coupled to the first line and the second line of the differential link,
    a second CM voltage divider including a first resistor in parallel with a second resistor, the first second CM voltage divider coupled to the first line and the second line of the differential link,
    a first N-type transistor coupled to the first line of the differential link via a first diode, and further coupled to the first CM voltage divider,
    a second N-type transistor coupled to the second line of the differential link via a second diode, and further coupled to the first CM voltage divider,
    a first P-type transistor coupled to a ground signal via a third diode, and further coupled to the second CM voltage divider, and
    a second P-type transistor coupled to the ground signal via a fourth diode and further coupled to the second CM voltage divider,
    wherein the second CM voltage divider is further coupled to the ground signal via a fifth diode.

17. The IC according to claim 16, wherein the transceiver and the clamp circuit are provided over a single substrate.

18. A vehicle, comprising:
  a shared network link;
  a plurality of nodes coupled to the shared network link; and
  a common mode (CM) voltage clamp coupled to one of the plurality of nodes, the CM voltage clamp comprising:
    a first CM voltage divider including a first resistor in parallel with a second resistor and a second CM voltage divider including a first resistor in parallel with a second resistor, the first and second CM voltage dividers each coupled to a first line and a second line of a differential link, wherein one of the first line or the second line corresponding to a positive line and another one of the first line or the second line corresponding to a negative line,
    two N-type transistors having their gate terminals coupled to the first CM voltage divider,
    two P-type transistors having their gate terminals coupled to the second CM voltage divider, and
    five diodes coupled to, respectively, a drain terminal of one of the two N-type transistors, a drain terminal of another one of the two N-type transistors, a source terminal of one of the two P-type transistors, a source terminal of another one of the two P-type transistors, and the second CM voltage divider.

19. The vehicle according to claim 18, wherein the CM voltage clamp is one of a plurality of CM voltage clamps, each of the plurality of CM voltage clamps coupled to a corresponding one of the plurality of nodes.

* * * * *